United States Patent [19]

Morimoto et al.

[11] Patent Number: 4,791,336

[45] Date of Patent: Dec. 13, 1988

[54] FLUORESCENT COMPOSITION AND FLUORESCENT LUMINOUS DEVICE

[75] Inventors: Kiyoshi Morimoto; Hitoshi Toki; Yoshitaka Satoh, all of Mobara, Japan

[73] Assignee: Futaba Denshi Kogyo Kabushiki Kaisha, Mobara, Japan

[21] Appl. No.: 66,072

[22] Filed: Jun. 24, 1987

[30] Foreign Application Priority Data

| Jun. 26, 1986 | [JP] | Japan | 61-149982 |
| Jun. 27, 1986 | [JP] | Japan | 61-152242 |
| Jul. 8, 1986 | [JP] | Japan | 61-158872 |
| Jul. 11, 1986 | [JP] | Japan | 61-164451 |
| Jul. 31, 1986 | [JP] | Japan | 61-180769 |

[51] Int. Cl.$^4$ .................. C09K 11/80; H01J 63/06
[52] U.S. Cl. ................. 313/496; 252/301.4 R; 252/301.4 P; 252/301.4 S; 252/301.4 H; 252/301.6 R; 252/301.6 P; 252/301.6 S
[58] Field of Search ........... 252/301.6 R, 301.6 S, 252/301.4 S, 301.4 P, 301.4 R, 301.4 H, 301.6 P; 313/496

[56] References Cited

U.S. PATENT DOCUMENTS 2,921,201 1/1960 Lieb ................. 252/301.6 R

FOREIGN PATENT DOCUMENTS

| 48-43034 | 12/1973 | Japan | 252/301.6 R |
| 5218482 | 8/1975 | Japan | 252/301.6 R |
| 55-135189 | 10/1980 | Japan | 252/301.6 R |
| 56-167782 | 12/1981 | Japan | 252/301.6 R |

Primary Examiner—Jack Cooper
Attorney, Agent, or Firm—Oblon, Fisher, Spivak, McClelland & Maier

[57] ABSTRACT

A fluorescent composition capable of emitting light of various luminous colors under electron or ultraviolet excitation and a fluorescent luminous device having mounted such a fluorescent composition mounter therein. The fluorescent composition has a general formula of $ZnO \cdot Ga_2O_3$ and emits light of a luminous spectrum distributed at an ultraviolet or visible region. The fluorescent composition includes a matrix of $ZnO \cdot Ga_2O_3$ and Cd doped in the matrix. The fluorescent luminous device includes at least one $ZnO \cdot Ga_2O_3$:Cd phosphor deposited on anode conductors and at least one luminous display section having an ultraviolet excitable visible light emitting phosphor deposited thereon within a region of radiation of ultraviolet rays emitted from the $ZnO \cdot Ga_2O_3$:Cd phosphor.

8 Claims, 15 Drawing Sheets

FLUORESCENT COMPOSITION AND FLUORESCENT LUMINOUS DEVICE

BACKGROUND OF THE INVENTION

1. Field of the Invention

This invention relates to a fluorescent composition and a fluorescent luminous device, and more particularly to a fluorescent composition capable of emitting light of various luminous colors under electron or ultraviolet excitation and a fluorescent luminous device utilizing such a phosphor composition.

2. Description of the Prior Art

A fluorescent composition is generally adapted to carry out emission due to excitation by external energy. The fluorescent composition is classified depending on energy for excitation. A fluorescent composition excited by electrons is called an electron excitation fluorescent composition, which includes a fluorescent composition for a CRT which exhibits luminance under electron excitation by an acceleration voltage of several ten KV and a fluorescent composition for a fluorescent display device which exhibits luminance by an acceleration voltage of several ten V.

A fluorescent composition excited by ultraviolet rays is called an ultraviolet excitation fluorescent composition, which includes a fluorescent composition for a fluorescent lamp which emits light of various luminous colors due to excitation by ultraviolet rays radiated due to discharge of a vapor of mercury.

Now, a fluorescent composition for a fluorescent display device will be described.

A fluorescent composition for a fluorescent display device is also called a low electron excitation fluorescent composition, because it exhibits luminance under excitation by a low acceleration voltage of several ten volts.

Of the fluorescent composition, a ZnO:Zn phosphor of a green luminous color can be energized by a luminance threshold voltage of only about 1 to 2 volts, with sufficient luminescence for display being obtained at an anode voltage of 10 to 20 volts. Because of such characteristics, the ZnO:Zn phosphor is superior as a low velocity electron excitation fluorescent composition. However, color emission from the ZnO:Zn phosphor is limited to the color green, thus, a sulfide system phosphor is extensively used to obtain luminous colors other than green.

The sulfide system phosphor includes, for example, ZnS:(Zn) (blue luminous color), ZnS:Mn (yellow to orange-colored), ZnS:Ag (blue), ZnS:Ag,Al (blue), ZnS:Au,Al (yellow green), $(Zn_{0.9}Cd_{0.1})S$:Au,Al (yellow), $(Zn_{0.8}Cd_{0.2})S$:Au,Al (orange-colored), $Y_2O_2S$:Eu (red) and the like. Unfortunately, the sulfide system phosphors each have high resistance, so that a conductive material such as $In_2O_3$, $SnO_2$ or the like is incorporated in the phosphor to decrease the resistance. However, such a conductive material blocks luminance of the phosphor to decrease luminous efficiency of the phosphor, because it is not a luminous material.

Also, the sulfide system phosphor is decomposed upon excitation by electron energy to scatter sulfide-containing gas because it contains sulfur. When the sulfide-containing gas is adhered to a filamentary cathode, it reacts with oxide of alkaline earth metal on a surface of the cathode to poison the surface, resulting in emission characteristics of the cathode being deteriorated as known to those skilled in the art. It is also known that such a phenomenon remarkably appears particularly when density of electrons exciting the phosphor is high.

In order to solve such a problem, it is proposed to increase luminous efficiency of the phosphor so that it may exhibit satisfied luminance even when density of electrons is low. More particularly, electrons of low density are impinged on the sulfide system phosphor to decrease energy of the electrons, to thereby prevent decomposition of the phosphor.

However, the conventional sulfide system phosphor contains a conductive material which does not contribute to luminance, so that a part of electrons flows through the conductive material to an anode conductor. This causes the part of the electrons to constitute an invalid current, resulting in luminous efficiency of the phosphor being deteriorated. Also, a decrease in density of electrons correspondingly decreases electrons exciting the phosphor, to thereby reduce luminance of the phosphor.

Further, a fluorescent composition of a non-sulfide system is also proposed, however, such a composition available fails to exhibit satisfactory luminous color, luminous efficiency and life.

As one of color fluorescent compositions known other than the sulfide system phosphor, a composite oxide phosphor of a gallate system is disclosed in Japanese Patent Publication No. 31236/1985. The phosphor has a composition indicated by a formula $A(Zn_{1-x},Mg_x)O \cdot Ga_2O_3 (0.6 \leq A \leq 1.2$ and $0 \leq x \leq 0.5)$. The luminous color is blue at $x=0$ and is shifted to a long wavelength side to approach the color green as $x$ goes away from 0. However, this causes its luminance threshold voltage to be increased.

Also, the $A(Zn_{1-x},Mg_x)O \cdot Ga_2O_3$ phosphor is decreased in luminescence to a degree sufficient to fail to permit it to be put to practical use. For example, it is described in the above-noted Japanese publication that $ZnO \cdot Ga_2O_3$ corresponding to $A(Zn_{1-x},Mg_x)O \cdot Ga_2O_3$ of $A=1$ and $x=0$ exhibits luminescence in the order of 4ft-L with an anode voltage of 80V and a cathode voltage of 0.6 V. Also, the Japanese publication teaches that a $(Zn_{0.7}Mg_{0.3})O \cdot Ga_2O_3)$ phosphor having MgO incorporated therein to obtain $A=1$ and $x=0.3$ has a luminous wavelength shifted to a long wavelength side, so that an increase in luminescence may be limited to 8ft-L at most under the same driving conditions of an anode voltage of 80 V and a cathode voltage of 0.6 V. Thus, it will be noted that the phosphor fails to exhibit luminescence sufficient to permit it to be put to practical use.

There is known a fluorescent composition which exhibits luminance under ultraviolet excitation other than low velocity electron excitation and carries out emission of various luminous colors extending from blue to red with good efficiency. Ultraviolet excitation does not cause decomposition of a fluorescent composition as compared with low velocity electron excitation, because the former utilizes light.

SUMMARY OF THE INVENTION

The present invention has been made in view of the foregoing disadvantage of the prior art while taking notice of the fact that doping of a $ZnO \cdot Ga_2O_3$ phosphor corresponding to the above-noted conventional $(Zn_{1-x},Mg_x)O \cdot Ga_2O_3$ phosphor of $x=0$ with Cd provides a composite oxide phosphor of a gallate system which is capable of emitting light of a blue luminous color, exhibiting high luminescence and being used for a fluorescent display device, as well as radiating ultraviolet rays sufficient to permit it to be used as an ultraviolet radiation source.

Also, the present invention has been made taking notice of the fact that doping of the $ZnO \cdot Ga_2O_3$ phosphor with Cd provides a composite oxide phosphor of a gallate system which is capable of being decreased in resistance, and further doping of the phosphor with a rare earth element provides a composite oxide phosphor of a gallate system which is capable of emitting light having a luminous color varied and being increased in luminescence and luminous efficiency, to thereby be used for a fluorescent display device, as well as being used for a PDP and a large-sized luminous cell.

The present invention also has been made taking notice of the fact that all kinds of sulfide system phosphors are excited by ultraviolet rays and the ultraviolet excitation causes each of the phosphors to carry out emission without decomposition because light excites an emission center of the phosphor, so that incorporation of a phosphor radiating ultraviolet rays under low velocity electron excitation in the sulfide system phosphor may provide a novel phosphor composition which is capable of exhibiting excellent emission characteristics, life, luminescence and the like when it is used for a fluorescent diplay device.

Further, the present invention has been made taking notice of the fact that an ultraviolet excitation fluorescent composition emits visible light under ultraviolet excitation, so that a first phosphor layer radiating ultraviolet rays under electron excitation is provided within a fluorescent luminous device and a second phosphor layer emitting visible light under ultraviolet excitation is provided within a radiation region of ultraviolet rays radiated from the first phosphor layer, to thereby provide a fluorescent luminous device which is capable of exhibiting excellent fluorescent efficiency and emission characteristics, long life, and satisfied luminescence.

Accordingly, it is an object of the present invention to provide a composite oxide phosphor of a gallate system which is capable of emitting light of a blue luminous color, exhibiting high luminescence and being used for a fluorescent display device, as well as radiating ultraviolet rays sufficient to permit it to be used as an ultraviolet radiation source.

It is another object of the present invention to provide a composite oxide phosphor of a gallate system which is capable of being decreased in resistance, It is a further object of the present invention to provide a composite oxide phosphor of a gallate system which is capable of emitting light having a luminous color varied and being increased in luminescence and luminous efficiency, to thereby be used for a fluorescent display device, as well as being used for a PDP and a large-sized luminous cell.

It is still another object of the present invention to provide a fluorescent luminous device which is capable of exhibiting excellent fluorescent efficiency and emission characteristics, long life, and satisfied luminescence.

In accordance with one aspect of the present invention, a fluorescent composition is provided. The fluorescent composition has a general formula of $ZnO \cdot Ga_2O_3:Cd$ and is excited under electron or ultraviolet excitation to emit light of a luminous spectrum distributed at an ultraviolet or visible region. The fluorescent composition comprises a matrix having a general formula of $ZnO \cdot Ga_2O_3$ and Cd doped in the matrix.

In accordance with another aspect of the present invention, a fluorescent luminous device is provided. The device includes filamentary cathode for emitting electrons, anode conductors to which an anode voltage is applied, and at least one $ZnO \cdot Ga_2O_3:Cd$ phosphor arranged so as to be electrically connected to the anode conductors. These electrode elements are received in an envelope. The device also includes at least one luminous display section having an ultraviolet excitation visible light emitting phosphor deposited thereon within a region of radiation of ultraviolet rays radiated from the $ZnO \cdot Ga_2O_3:Cd$ phosphor.

BRIEF DESCRIPTION OF THE DRAWINGS

These and other objects and many of the attendant advantages of the present invention will be readily appreciated as the same becomes better understood by reference to the following detailed description when considered in connection with the accompanying drawings in which like reference numerals designate like or corresponding parts throughout; wherein.

DETAILED DESCRIPTION OF THE PREFERRED EMBODIMENT

Figure 1:
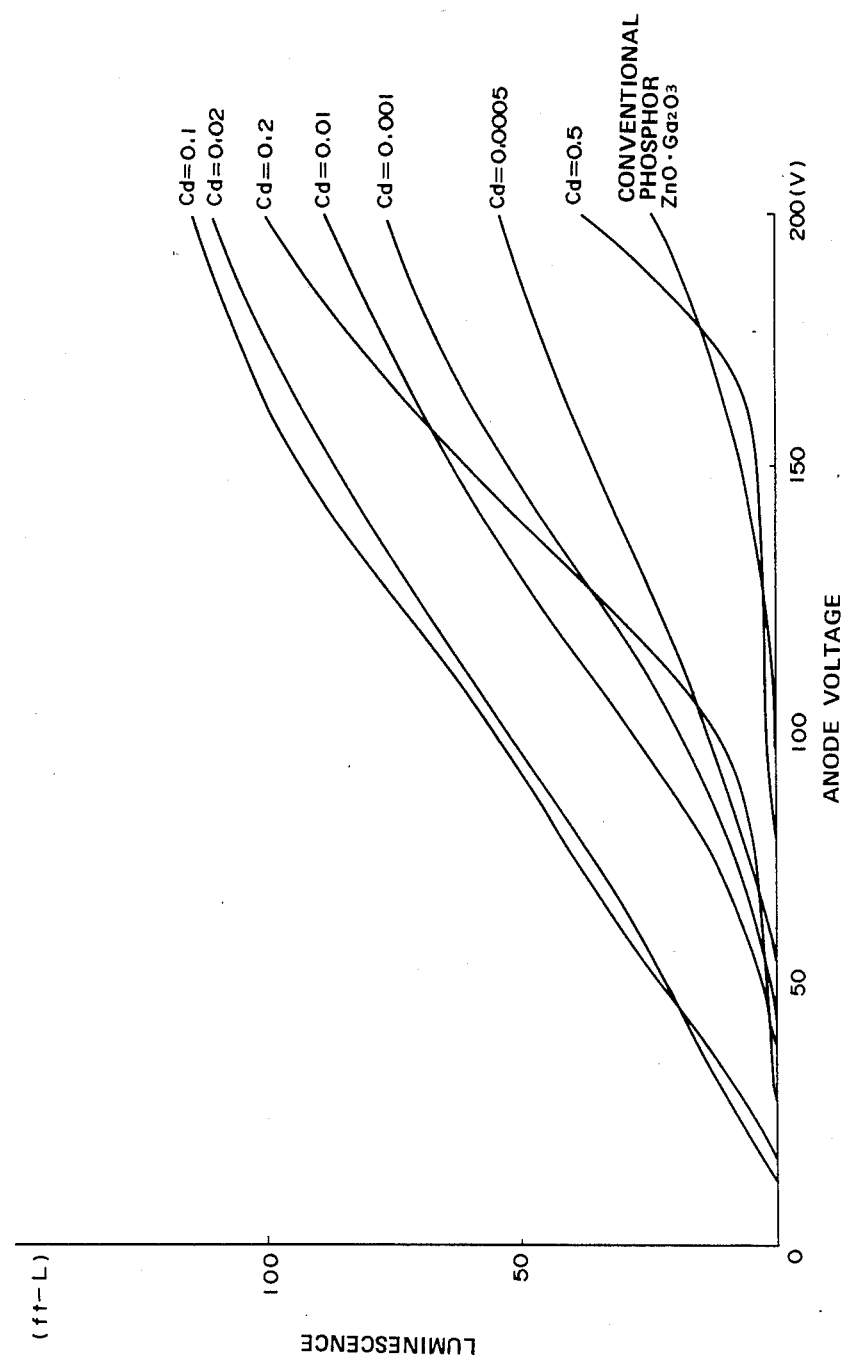
FIG. 1 is a graphical representation showing relationships between an anode voltage and luminescence of a $ZnO \cdot Ga_2O_3:Cd$ phosphor according to the present invention which are obtained by varying a content of Cd in the phosphor.

Now, a fluorescent composition and a fluorescent luminous device according to the present invention will be described hereinafter with reference to examples.

EXAMPLE 1

Synthesis of a $ZnO \cdot Ga_2O_3$:Cd phosphor which is a fluorescent composition of the present invention is preferably carried out when a molar ratio of $Ga_2O_3$ to ZnO is in a range of 1:0.5–4.0. This example was practiced using ZnO in an amount of 1 mol. More specifically, the phosphor was synthesized by varying the amount of $CdCO_3$ which is a source of a Cd component while fixing the amount of $Ga_2O_3$ at 1.87 g and fixing ZnO as a source of a Zn component in an amount of 0.81 g. The amounts of $CdCO_3$ varied were determined on the basis of the amount of dope of Cd in the above-noted composition formula, as follows:

TABLE 1

| Amount of dope of Cd (mol) | $Ga_2O_3$ (g) | ZnO (g) | $CdCO_3$ (g) |
|---|---|---|---|
| $5 \times 10^{-4}$ | 1.87 | 0.81 | 0.00086 |
| $1 \times 10^{-3}$ | 1.87 | 0.81 | 0.0017 |
| $1 \times 10^{-2}$ | 1.87 | 0.81 | 0.017 |
| $2 \times 10^{-2}$ | 1.87 | 0.81 | 0.034 |
| $1 \times 10^{-1}$ | 1.87 | 0.81 | 0.17 |
| $2 \times 10^{-1}$ | 1.87 | 0.81 | 0.34 |
| $5 \times 10^{-1}$ | 1.87 | 0.81 | 0.86 |

$Ga_2O_3$ may be replaced with gallium nitrate, gallium carbonate, gallium sulfate or the like which is readily converted into $Ga_2O_3$ by firing.

Likewise, ZnO and $CdCO_3$ may be replaced with zinc and cadmium compounds such as zinc and cadmium nitrates, zinc and cadmium carbonates, zinc and cadmium sulfates, or the like which are readily changed to ZnO and CdO, respectively. The amounts of these compounds used and mixed are calculated based on ZnO and CdO.

The components were fully mixed together to prepare each mixture. The mixing may be conveniently carried out using a ball mill, a mixer, mortar or the like.

The so-obtained each mixture was placed in a heat-resistant vessel such as an alumina boat and then subjected to firing in air at 1200° C. for two hours to synthesize a fluorescent composition. The fluorescent composition obtained was an aggregate of phosphor crystals. Subsequently, the composition was divided and then fired in air at 1000° C. for about three hours, so that it might be provided with more crystallizability.

Thereafter, the so-synthesized fluorescent compositions doped with Cd in different amounts as shown in Table 1 each were pasted using an organic binder and deposited on anode conductors arranged on a glass substrate by printing. Above the deposited phosphors were stretchedly arranged control electrodes and filamentary cathodes, and then these electrodes were received in a casing formed of side walls and a front cover, which was then evacuated to high vacuum, resulting in a fluorescent display device.

The fluorescent display devices in which the seven fluorescent compositions doped with Cd in amounts varied in a range of 0.0005 to 0.5 mol as shown in Table 1 were operated together with fluorescent display devices each having conventional $ZnO \cdot Ga_2O_3$ mounted therein, to thereby determine luminescence characteristics.

FIG. 1 shows luminescence of each of the phosphors obtained under conditions that a cathode voltage and a control electrode voltage were set at 1.7 V and 12 V, respectively, and an anode voltage applied while being varied in a range of 0 to 200 V.

As is apparent from FIG. 1, Cd fails to contribute to an improvement of luminescence when the amount of dope thereof is less than 0.0005 mol and exhibits luminescence of substantially the same level as that of the conventional $ZnO \cdot Ga_2O_3$ phosphor free of Cd doped.

The fluorescent composition doped with Cd in an amount more than 0.2 mol, for example, 0.5 mol not only merely exhibits substantially the luminescence as that of the conventional phosphor free of Cd but often exhibits luminescence below the conventional one.

Thus, it was found that the amount of dope of Cd is preferably within a range of $5 \times 10^{-4}$ to $3 \times 10^{-1}$ mol.

Figure 3:
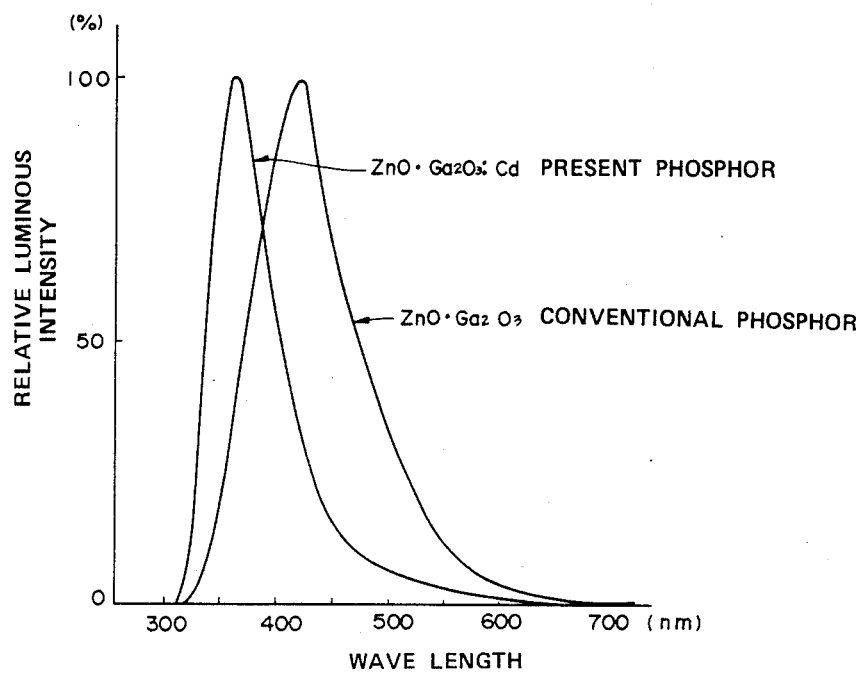
FIG. 3 is a graphical representation showing spectra of a fluorescent composition of the present invention and a conventional a $ZnO \cdot Ga_2O_3$ phosphor.

Then, a fluorescent display device in which the present ZnO·Ga$_2$O$_3$ phosphor doped with Cd of 0.1 mol was mounted was operated together with that in which the conventional ZnO·Ga$_2$O$_3$ phosphor was mounted for comparison. FIG. 3 shows a spectrum of a luminous color of each of the fluorescent display devices. FIG. 3 indicates that the fluorescent composition of the present invention exhibited a luminous color having a peak wavelength near 365 nm which is in a ultraviolet region, as well as a wavelength of about 400 nm larger than the peak wavelength. Thus, it will be noted that the present fluorescent composition exhibited a blue luminous color at a visible region. This means that the luminous spectrum of the present fluorescent composition was shifted to a short wavelength side as compared with that of the conventional ZnO·Ga$_2$O$_3$.

Figure 4:
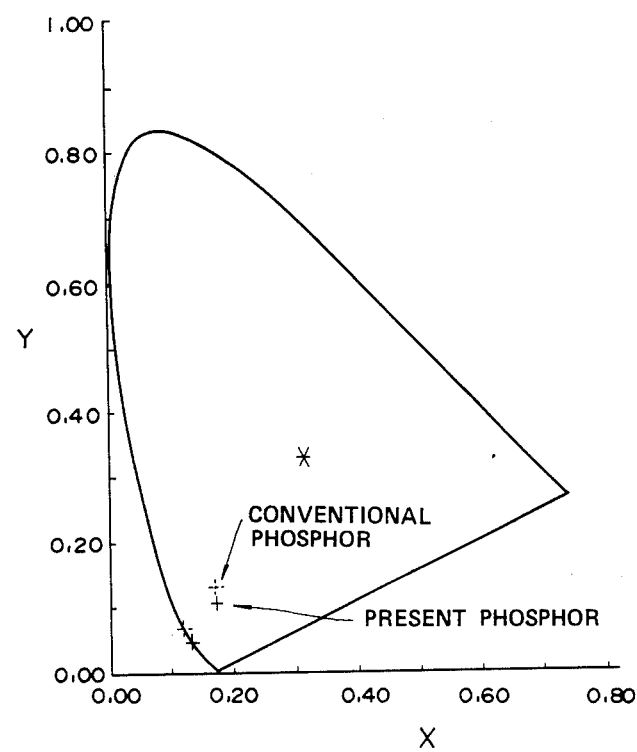
FIG. 4 is a graphical representation showing chromaticity of CIE of each of a fluorescent composition of the present invention and a conventional a $ZnO \cdot Ga_2O_3$ phosphor.

FIG. 4 shows chromaticity coordinates of CIE, wherein the present fluorescent composition formed of the ZnO·Ga$_2$O$_3$ phosphor doped with Cd of 0.1 mol was plotted at a chromaticity point of x=0.171 and y=0.105 and had good color purity of 80.0%. The conventional ZnO Ga$_2$O$_3$ phosphor was plotted at a chromaticity point of x=0.170 and y=0.130 and had color purity of 76.5%. This clearly indicates that the present ZnO·Ga$_2$O$_3$ phosphor doped with Cd can be used as a blue light emitting fluorescent composition having satisfied color purity. The fluorescent composition of the present invention mounted in a fluorescent display device exhibited luminescence characteristics shown in FIG. 1 by varying an anode voltage within a range of 0–200 V. However, in general, a fluorescent display device is typically operated at an anode voltage of 100 V or less. Accordingly, in order to consider applicability of the present fluorescent composition as a low velocity electron excitation fluorescent composition, the fluorescent display device was operated at an anode voltage of 1.7 V, a cathode voltage of 1.7 V and a control electrode voltage of 12 V. The test revealed that doping of Cd in an amount of 0.1 mol causes the fluorescent composition to exhibit the highest luminescence of 50ft-L. The second highest luminescence was 47ft-L obtained when the amount of dope of Cd was 0.02 mol. The third luminescence was 20ft-L exhibited at doping of Cd in an amount of 0.01 mol.

The conventional ZnO·Ga$_2$O$_3$ phosphor had luminescence as low as 1ft-L under the same conditions because it is a high velocity electron excitation phosphor. Thus, it will be noted that the fluorescent composition of the present invention can be fully put to practical use as a low velocity electron excitation fluorescent composition for a fluorescent display device.

Figure 5:
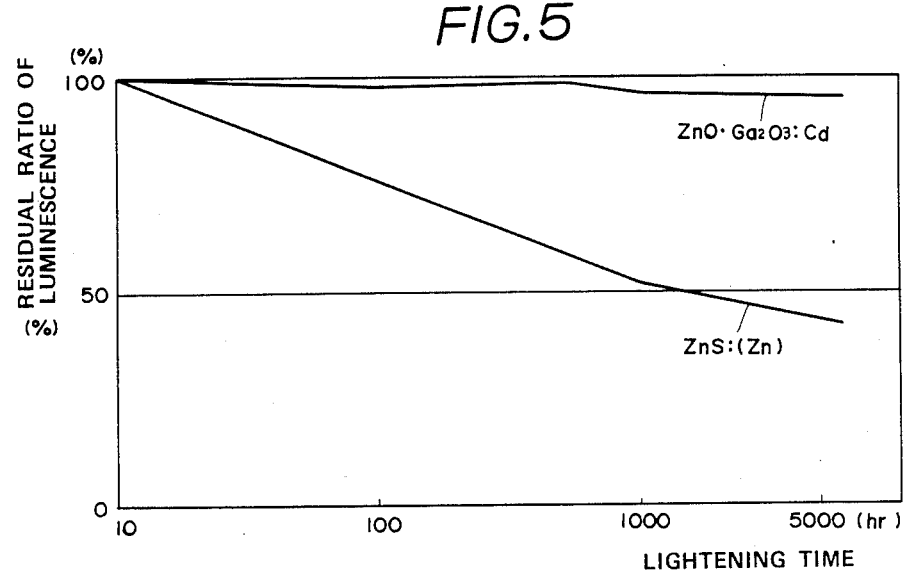
FIG. 5 is a graphical representation showing a residual ratio of luminescence of each of a $ZnO \cdot Ga_2O_3:Cd$ phosphor of the present invention and a conventional $ZnS:(Zn)$ sulfide system phosphor which was mounted in a fluorescent display device and subjected to a lightening test for 5000 hours.

FIG. 5 shows life characteristics which were obtained by mounting the ZnO·Ga$_2$O$_3$:Cd phosphor of the present invention and the conventional ZnS:(Zn) phosphor in fluorescent display devices and operating each of the devices at an anode voltage 90 V, a control electrode voltage of 12 V and a cathode voltage of 1.7 V for 5000 hours, wherein a residual rate of luminescence of each phosphor indicating lowering the luminescence was plotted in relation to initial luminescence of 100.

As will be apparent from FIG. 5, the ZnO·Ga$_2$O$_3$:Cd phosphor of the present invention never poisoned a filamentary cathode because of being free of any S component. Accordingly, it kept a residual ratio of luminescence high irrespective of operation for a long period of time as compared with the convention sulfide phosphor, as indicated from the fact that it was kept at a high level of 95% even after the lapse of 5000 hours, whereas in the conventional ZnS:(Zn) phosphor, it was decreased to a level below 50% after 5000 hours.

Thus, it will be noted that the ZnO·Ga$_2$O$_3$:Cd phosphor of the present invention has an advantage capable of exhibiting excellent emission characteristics suitable for use for a fluorescent display device and providing a fluorescent display device of a long life.

EXAMPLE 2

In Example 1, the optimum range of oope of Cd was determined while fixing a molar ratio of ZnO to Ga$_2$O$_3$ at 1:1. In this example, the optimum amount of ZnO in the ZnO·Ga$_2$O$_3$:Cd phosphor of the present invention was determined.

FIG. 1, as noted above, indicates doping of Cd in an amount of 0.1 mol causes the fluorescent composition to exhibit optimum luminescence characteristics. In Example 2, in view of the fact, seven phosphors were prepared by varying the amount of ZnO in a range of 0.1 to 5 mol while fixing the amount of dope of Cd at 0.1 mol with respect to Ga$_2$O$_3$ in an amount of 1 mol. The amount of each of materials used was as shown in Table 2.

TABLE 2

| ZnO (mol) | ZnO (g) | CdCO$_3$ (g) | Ga$_2$O$_3$ (g) |
|---|---|---|---|
| 0.1 | 0.081 | 0.17 | 1.87 |
| 0.5 | 0.41 | 0.17 | 1.87 |
| 1 | 0.81 | 0.17 | 1.87 |
| 2 | 1.63 | 0.17 | 1.87 |
| 3 | 2.44 | 0.17 | 1.87 |
| 4 | 3.26 | 0.17 | 1.87 |
| 5 | 4.07 | 0.17 | 1.87 |

Each of the fluorescent compositions was prepared according to the procedures described in Example 1. The obtained fluorescent compositions each were mounted in a fluorescent display device, which was operated under driving conditions that a cathode voltage, a control electrode voltage and an anode voltage are set at 1.7 V, 12 V and 90 V, respectively. The results were as shown in FIG. 2.

Figure 2:
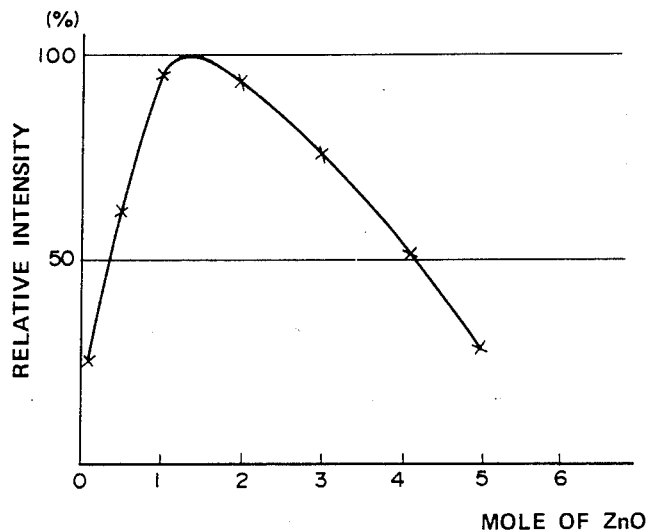
FIG. 2 is a graphical representation showing relationships between the number of moles of ZnO in a $ZnO \cdot Ga_2O_3:Cd$ phosphor of the present invention and relative luminescence.

In FIG. 2, an axis of abscissas indicates a molar value (mol) of ZnO and an axis of ordinates indicates a relative luminous intensity. FIG. 2 indicates that ZnO in an amount of about 1.3 mol caused the fluorescent composition to exhibit maximum luminous intensity and the amount of ZnO within a range of 0.5 to 4 mol ensured luminous intensity more than 50% based on the maximum one.

Thus, it will be noted that the amount of ZnO sufficient to put the fluorescent composition to practical use ranges from 0.5 to 4 mol.

EXAMPLE 3

A ZnO·Ga$_2$O$_3$:Cd phosphor which is included in the fluorescent composition of the present invention was studied. It carried out emission of a luminous color at a ultraviolet region as well as a blue luminous color at a visible region described above under electron excitation. More particularly, it emitted ultraviolet rays having a wavelength of about 3600 A under low or high velocity electron excitation, as indicated by a luminous spectrum of FIG. 3.

Thus, it will be noted that a fluorescent display device in which the fluorescent composition of the example is mounted is capable of being substituted for a known black-light lamp which is a kind of a fluorescent discharge tube radiating near-ultraviolet rays having a fluorescent spectrum of about 3600 A. The conventional black-light lamp is adapted to radiate ultraviolet rays of 2537 A emitted from mercury on a fluorescent composition radiating ultraviolet rays of 3650 A, to thereby radiate ultraviolet rays of only 3650 A. On the contrary, use of the fluorescent composition of the example for a fluorescent display device permits it to radiate ultraviolet rays of only 3650 A under electron excitation without using harmful mercury.

Visible rays may be blocked by means of cobalt glass to permit only ultraviolet rays to be transmitted.

Also, the fluorescent composition of the example is capable of emitting ultraviolet rays of 3650 A even under excitation by ultraviolet rays of 2537 A, so that it may be also used as phosphor for the conventional black-light lamp.

Further, ultraviolet emission from the fluorescent composition of the example may be utilized for an index of a cathode ray tube which does not use a shadow mask.

A fluorescent composition for the index is provided for every group of red, green and blue lights from a color cathode ray tube, and light from the fluorescent composition is received by a photodiode, which feedbacks it in the form of a red, blue or green signal to control positioning and gathering of a beam. Accordingly, luminance of a fluorescent composition for the index is preferably invisible, therefore, the fluorescent composition of the example of which visible rays are cut is conveniently used therefor.

EXAMPLE 4

The fluorescent composition of the present invention also includes one represented by the following general formula $$ZnO \cdot Ga_2O_3:Cd,Re$$

wherein Re indicates a rare earth element. The rare earth element Re suitable to be doped in the fluorescent composition is at least one selected from the group consisting of cerium Ce, praseodymium Pr, neodymium Nd, samarium Sm, europium Eu, terbium Tb, dysprosium Dy, holmium Ho, erbium Er and thulium Tm.

A matrix or host material of the fluorescent composition of the example is a mixed crystal comprising ZnO and $Ga_2O_3$. A molar ratio of ZnO to $Ga_2O_3$ is preferably 1:0.5-4.0, as noted above. More particularly, the amount of ZnO less than 0.5 mol increases resisaance of the fluorescent composition to a degree sufficient to cause it to fail to emit light under low velocity electron excitation, whereas ZnO in an amount more than 4.0 mol fails in doping of the activator or Cd and rare earth element, resulting in a failure of an aimed fluorescent composition.

The example employed a molar ratio of ZnO to $Ga_2O_3$ of 1:1 because of being convenient.

Cadmium Cd and the above-noted rare earth element were used as an activator to be doped.

The activator Cd may be added in the form of its carbonate such as, for example, $CdCO_3$. However, it may be added or mixed in the form of its nitrate, its sulfate or the like. Then, $ZnO \cdot Ga_2O_3:Cd$ phosphors were synthesized to determine the amount of the activator Cd to be used by varying the amount of dope of Cd within a range of $5 \times 10^{-4}$ to $5 \times 10^{-1}$ atm/mol while fixing the amount of each of $Ga_2O_3$ and ZnO at 1 mol and measuring relative luminescence of each of the phosphors. The results were as shown in FIG. 5, which indicates that the amount of dope of Cd below $5 \times 10^{-4}$ atm/mol deteriorated relative luminescence, wheress dope of Cd in an amount of more than $2 \times 10^{-1}$ atm/mol decreased relative luminescence to a level below 50%. Accordingly, it was found that the amount of dope of Cd preferably ranges from $5 \times 10^{-4}$ atm/mol to $3 \times 10^{-1}$ atm/mol. In particular, dope of Cd in an amount of $1 \times 10^{-1}$ atm/mol caused the fluorescent composition to exhibit optimum luminescence.

Now, a rare earth element as an activator will be described.

When a fluorescent composition is doped with a rare earth element, it constitutes an emission center, so that a luminous color of the composition depends on a rare earth element to be doped. As a result that the fluorescent composition of the example was doped with each of various rare earth elements in an amount of $1 \times 10^{-2}$ atm/mol, the following relationships were obtained between the rare earth element and the luminous color:

TABLE 3

| Rare earth element | Symbol of element | Luminous color |
|---|---|---|
| Cerium | Ce | Blue |
| Praseodymium | Pr | White |
| Neodymium | Nd | Orange-colored |
| Samarium | Sm | Red |
| Europium | Eu | Red |
| Terbium | Tb | Green |
| Dysprosium | Dy | Yellow |
| Holmium | Ho | Green |
| Erbium | Er | Green |
| Thulium | Tm | Blue |

The above-noted rare earth metals may be added in the form of oxides such as, for example, europium oxide $Eu_2O_3$, terbium oxide $Tb_2O_3$, thulium oxide $Tm_2O_3$ and the like.

The amount of dope of the rare earth metals was determined according to the following procedures.

Figure 11:
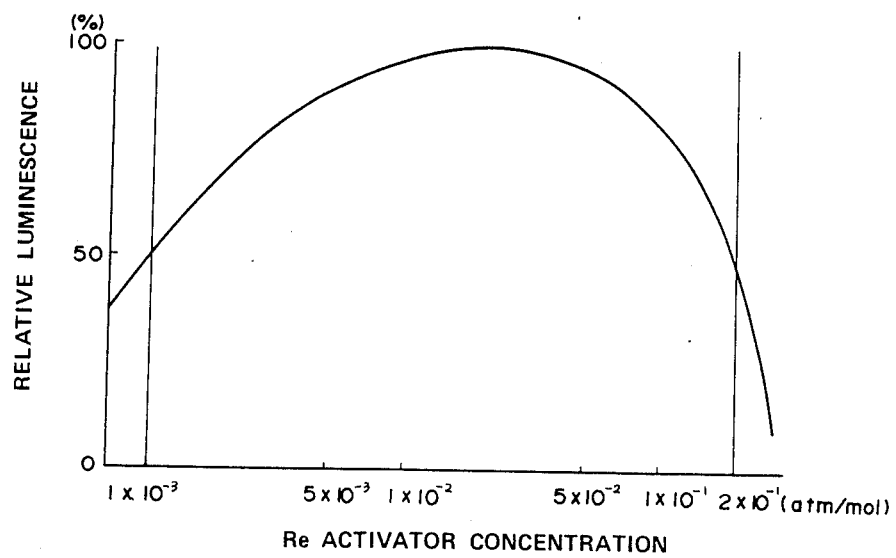
FIG. 11 is a graphical representation showing relationships between a concentration of a rare earth element activator and relative luminescence.

Of the results of determination of the amount of dope of Cd, the best result was chosen. A matrix was formed of 1 mol ZnO and 1 mol $Ga_2O_3$, and the amount of dope of Cd was fixed at 0.1 atm/mol. Eu, Tb and Tm were selected as a rare earth element and doped in an amount of $1 \times 10^{-3}$ to $2 \times 10^{-1}$ atm/mol to synthesize ZnO $Ga_2O_3$:Cd,Re phosphor compositions, which were then mounted in fluorescent display devices to measure relative luminescence. FIG. 11 is a graphical representation showing relationships between a concentration of the rare earth element and relative luminescence of the compositions.

As is apparent from FIG. 11, the amount of dope of the rare earth element in an amount of $1 \times 10^{-3}$ to $2 \times 10^{-1}$ atm/mol caused the fluorescent display device to exhibit relative luminescence above 50% which is sufficient to permit it to be put to practical use. Doping of the rare earth element in an amount less than $1 \times 10^{-3}$ atm/mol decreased an emission center, so that the rare earth element failed in emission, whereas the amount above $2 \times 10^{-1}$ atm/mol reduced luminescence of the fluorescent composition due to concentration quenching.

Thus, it was found that the amount of dope of the rare earth element preferably ranges from $1 \times 10^{-3}$ to $2 \times 10^{-1}$ atm/mol.

Determination of the amount of dope of the rare earth element was carried out using Eu, Tb and Tm. It is estimated that the above-noted results can be obtained also when other rare earth elements are used. Each of the rare earth elements was doped in an amount of $1 \times 10^{-2}$ atm/mol to synthesize a fluorescent composition, which was then mounted in a fluorescent display device to measure its luminescence as well as its luminous color. The result indicated that the luminescence was sufficient to permit the fluorescent composition to be put to practical use.

Now, a process for preparing the fluorescent composition of the example will be described.

1 mol $Ga_2O_3$ and 0.5 to 4.0 mol ZnO are used. Also, $CdCO_3$ is used in an amount ranging from $5 \times 10^{-4}$ to $3 \times 10^{-1}$ atm/mol based on Cd with respect to the $ZnO \cdot Ga_2O_3$ matrix in an amount of 1 mol. The rare earth element is selected depending on a luminous color desired. The rare earth element selected is used in the form of its oxide ($Re_2O_3$) and doped in an amount of $1 \times 10^{-3}$ to $2 \times 10^{-1}$ atm/mol.

The weighed ZnO, $Ga_2O_3$ and $Re_2O_3$ are then fully mixed together to form a mixture. Subsequently, the mixture is placed in a heat-resistant vessel such as an aluminum boat and then subjected to firing in an electric furnace at 1000°–1500° C. for 2–10 hours to synthesize a fluorescent composition. The firing in the furnace may be carried out using any one of oxidizing, neutral and weak-reducing atmospheres.

The synthesized fluorescent composition comprises an aggregate of phosphor crystals. Thereafter, the phosphor composition is powdered and then fired in a weak-reducing atmosphere at 1000°–1500° C. for 1–5 hours to obtain good crystallizability.

Now, the method will be more detailedly described with reference to the following experiments.

Experiment 1

In the experiment, a fluorescent composition was prepared by doping a $ZnO \cdot Ga_2O_3$ matrix with Cd and a rare earth element Eu. The matrix was obtained by crystallizing $Ga_2O_3$ and ZnO at a molar ratio of 1:1. Cd and Eu were used in amounts of $1 \times 10^{-1}$ atm/mol and $1 \times 10^{-2}$ atm/mol as an activator to be doped.

More specifically, 0.81 g ZnO, 1.87 g $Ga_2O_3$, and 0.17 g $CdCO_3$ corresponding to Cd of $1 \times 10^{-1}$ atm/mol and 0.018 g $Eu_2O_3$ corresponding to Eu of $1 \times 10^{-2}$ atm/mol were fully mixed together using a mixing means such as a mortar, a mixer or the like.

The mixture was placed in an alumina boat and then fired in an electric furnace of air atmosphere at 1300° C. for 2 hours to synthesize a fluorescent composition comprising an aggregate of phosphor crystals. Then, it was left to stand to a room temperature, powdered, placed in an aluminum boat and then subjected to firing in a weak-reducing atmosphere at 1000° C. for 3 hours to obtain a $ZnO \cdot Ga_2O_3$:Cd,Eu phosphor of good crystallizability.

Figure 6:
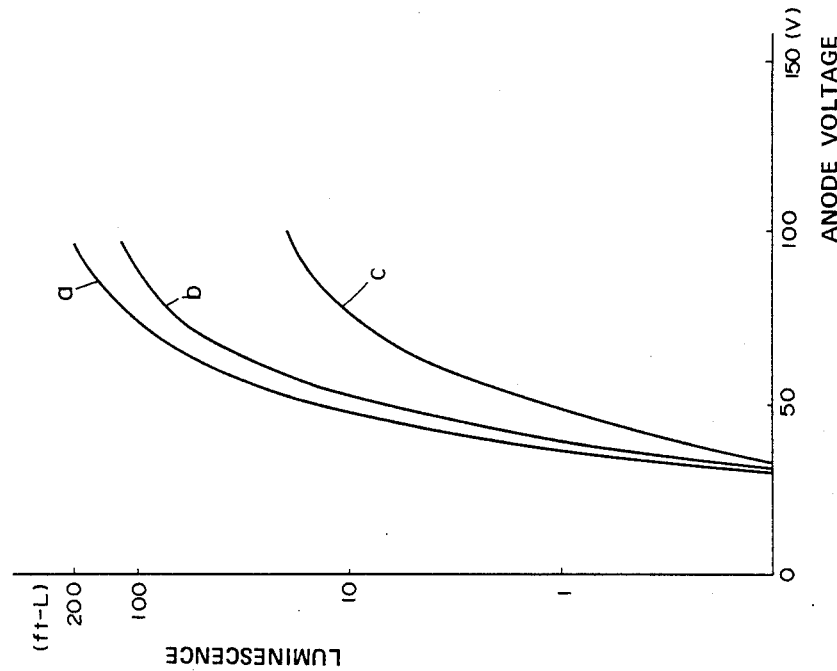
FIG. 6 is a graphical representation showing relationships between an anode voltage and luminescence obtained due to emission of a fluorescent composition of the present invention.

The so-synthesized fluorescent composition was deposited on anode conductors of a fluorescent display device by means of an organic binder by screen printing to be mounted in the device, which was then operated at a cathode voltage of 1.7 V, a control electrode voltage of 12 V and an anode voltage 30–100 V, resulting in relationships between the anode voltage and luminescence as indicated at a curve a in FIG. 6. FIG. 6 shows that an anode voltage of 100 V caused the fluorescent composition to exhibit luminescence of 120ft-L.

Figure 7:
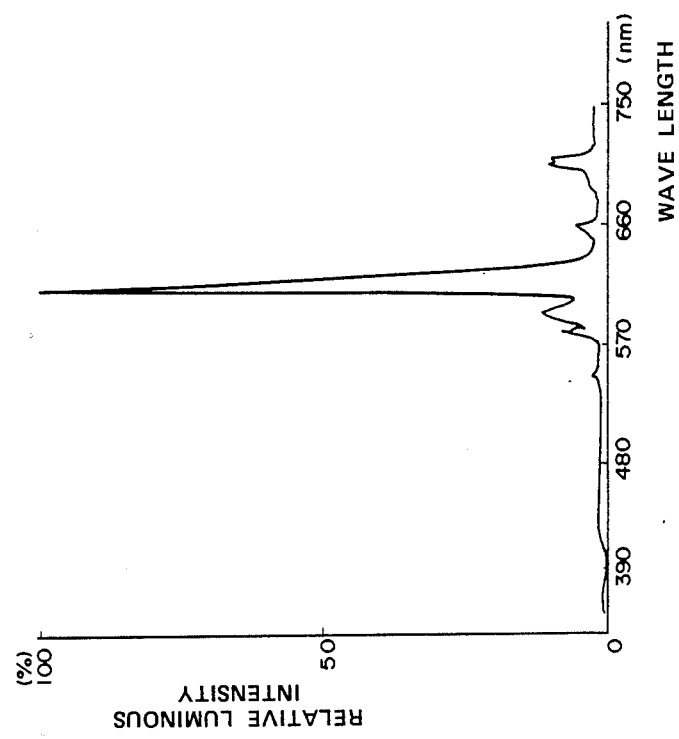
FIG. 7 is a graphical representation showing a luminous spectrum of a $ZnO \cdot Ga_2O_3:Cd,Eu$ phosphor of the present invention.

Also, it was found that the fluorescent composition, as shown in FIG. 7, emitted light of a red luminous color having a main peak near 600 nm.

Experiment 2

In the experiment, a fluorescent composition was prepared by doping a $ZnO \cdot Ga_2O_3$ matrix or host material with Cd and a rare earth element Tb.

The matrix was made by mixing $Ga_2O_3$ and ZnO at a molar ratio of 1:1 and doped with Cd of $1 \times 10^{-1}$ atm/mol and Tb of $1 \times 10^{-2}$ atm/mol.

More specifically, 0.81 g ZnO, 1.87 g $Ga_2O_3$, 0.17 g $CdCO_3$ and 0.018 g $Tb_2O_3$ were fully mixed together as in Experiment 1 to make a mixture, which was then subjected to firing to prepare $ZnO \cdot Ga_2O_3$:Cd ($1 \times 10^{-1}$ atm/mol),Tb ($1 \times 10^{-2}$ atm/mol) phosphor.

The so-synthesized phosphor was mounted in a fluorescent display device, which was then operated at a cathode voltage of 1.7 V and a control electrode voltage of 12 V while varying an anode voltage within a range of 0–100 V to measure luminescence. The result was as indicated at a curve b in FIG. 6, which shows that the luminescence was 200ft-L at an anode voltage of 100 V.

Figure 8:
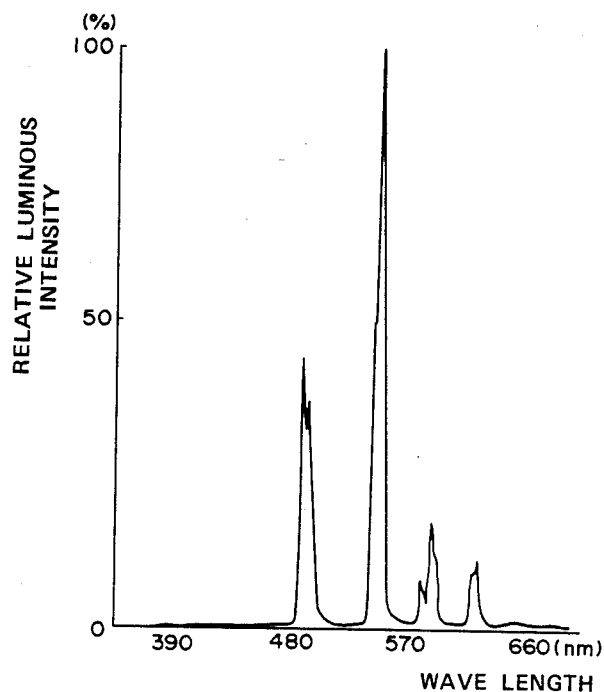
FIG. 8 is a graphical representation showing a luminous spectrum of a $ZnO \cdot Ga_2O_3:Cd,Tb$ phosphor according to the present invention.

Also, the fluorescent composition emitted light of a blue luminous color having a main peak near 550 nm and having a spectrum distributed near 500–620 nm, as seen from a luminous spectrum shown in FIG. 8.

Experiment 3

A $ZnO \cdot Ga_2O_3$ matrix was doped with Cd and a rare earth element Tm which constitute an activator to synthesize a fluorescent composition.

The matrix was prepared by mixing $Ga_2O_3$ and ZnO at a molar ratio of 1:1 and then doped with Cd of $1 \times 10^{-1}$ atm/mol and Tm of $1 \times 10^{-2}$ atm/mol.

Specifically, 0.81 g ZnO, 1.87 g $Ga_2O_3$, 0.17 g $CdCO_3$ and 0.019 g $Tm_2O_3$ are fully mixed to prepare a mixture, which was then fired to synthesize a $ZnO \cdot Ga_2O_3$:Cd,Tm phosphor composition.

The synthesized composition was mounted in a fluorescent display device, which was then operated at a cathode voltage of 1.7 V and a control electrode voltage of 12 V while varying an anode voltage between 0 V and 100 V to measure luminescence. The fluorescent composition had a threshold voltage of 33 V and exhibited luminescence of 20ft-L at an anode voltage of 100 V. Relationships between the anode voltage and luminescence were as indicated at a curve c in FIG. 6.

Figure 9:
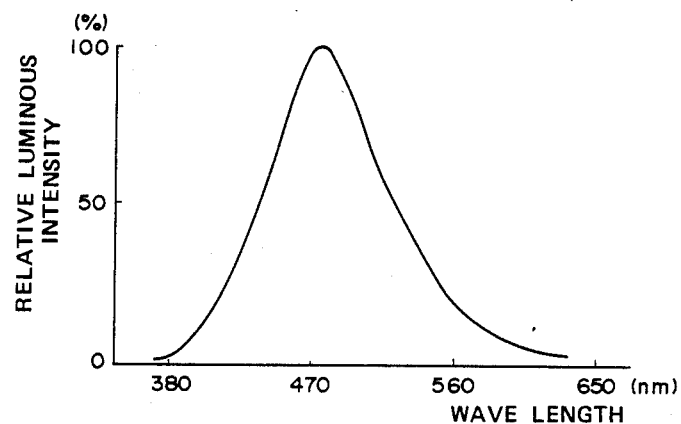
FIG. 9 is a graphical representation showing a luminous spectrum of a $ZnO:Ga_2O_3:Cd,Tm$ phosphor of the present invention.
Figure 10:
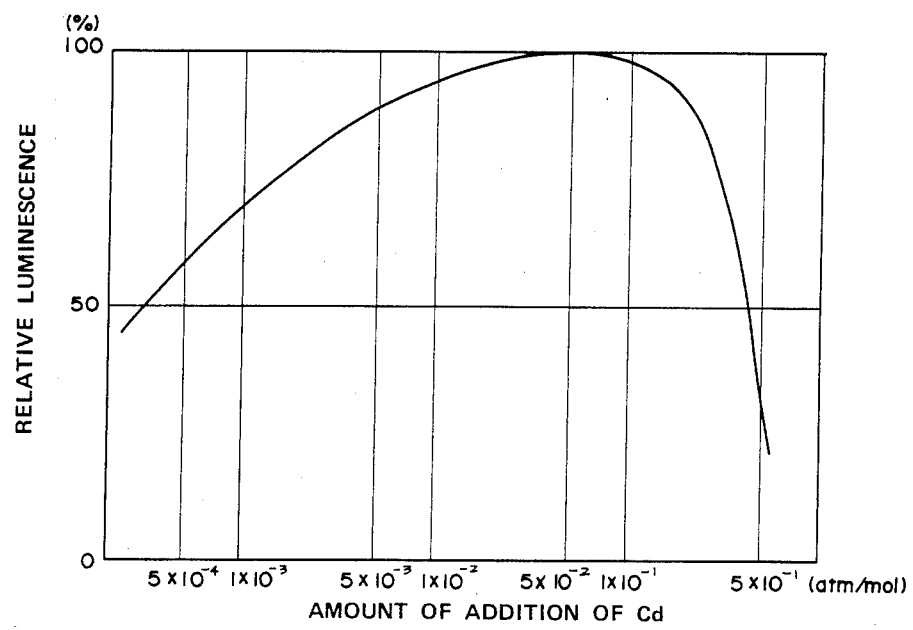
FIG. 10 is a graphical representation showing relationships between the amount of addition of an activator Cd and relative luminescence.

Also, the phosphor composition emitted light of a blue luminous color having a peak near 470 nm as seen from a luminous spectrum of FIG. 9.

EXAMPLE 5

The fluorescent composition of the present invention also involves a mixture of a ultraviolet radiation phosphor and an electron excitation visible light emitting phosphor or phosphor which emits visible light under electron excitation. The example was practiced to determine a mixing ratio between both phosphors.

A $ZnO \cdot Ga_2O_3$:Cd phosphor was selected as the ultraviolet radiation phosphor and a green light emitting ZnS:Cu,Al phosphor was used as the electron excitation visible light emitting phosphor.

In general, an excess of the ultraviolet radiation phosphor causes a relative decrease in the electron excitation visible light emitting phosphor, so that luminescence may not be obtained which is sufficient to permit the fluorescent composition to be put to practical use; whereas, when the ultraviolet radiation phosphor is too little, the fluorescent composition fails to exhibit desired luminescence under low energy electron excitation because this causes ultraviolet rays to be decreased which serve as a second excitation source for the visible light emitting phosphor and causes a conductive component to be decreased.

In view of the above, in the example, fluorescent compositions were synthesized in which a mixing ratio A/B between the $ZnO \cdot Ga_2O_3$:Cd phosphor of A wt % and the ZnS:Cu,Al phosphor of B wt % was varied within a range of 0/100 to 100/0 and were mounted in fluorescent display devices to measure relative luminescence, to thereby determine the optimum mixing ratio.

The $ZnO \cdot Ga_2O_3$:Cd phosphor doped with 0.1 mol Cd was prepared by fully mixing 0.81 g ZnO, 0.17 g $CdCO_3$ and 1.87 g $Ga_2O_3$ together using a suitable mixing means such as a ball mill, mixer, a mortar or the like to make a mixture, placing the mixture in a heat-resistant vessel such as an alumina boat or the like, and then firing the mixture in a furnace of an air atmosphere at 1300° C. for 5 hours.

As the ZnS:Cu,Al phosphor which is known in the art, a commercially available one was used.

Figure 12:
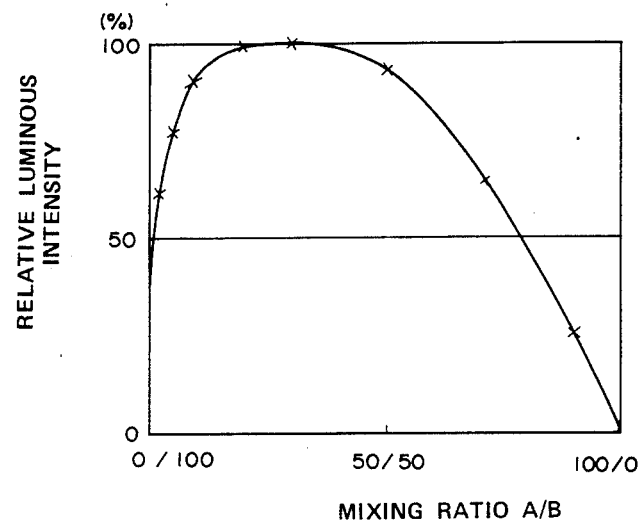
FIG. 12 is a graphical representation showing relationship between a mixing ratio between ultraviolet radiation $ZnO \cdot Ga_2O_3:Cd,Tm$ phosphor and visible light emitting ZnS:Cu,Al phosphor and relative luminescence.

The phosphors were mixed at mixing ratios A/B of 2/98, 5/95, 10/90, 20/80, 30/70, 50/50, 70/30 and 90/10 to make fluorescent compositions, which were mounted in fluorescent display devices to measure relative luminescence. The results were as shown in FIG. 12. Similar results were obtained by substituting other sulfide system phosphors such as ZnS:(Zn), $(Zn_{0.2}Cd_{0.8})$S:Ag,Cl and the like for ZnS:Cu,Al.

Thus, it was found that the fluorescent composition in which the mixing ratio between the ultraviolet radiation $ZnO \cdot Ga_2O_3$:Cd of A wt % and the sulfide system phosphor of B wt % as the electron excitation visible light emitting phosphor is in a range of $2/98 \leq A/B \leq 70/30$ exhibits luminescence above 50% which is sufficient to put it to practical use and excellent life characteristics.

EXAMPLE 6

A sulfide system phosphor used as the electron excitation visible light emitting phosphor in the present invention generally has high resistance. In the example, a fluorescent composition of the present invention was prepared which has a small mount of a conductive material such as $In_2O_3$ added thereto to decrease resistance of a deposited phosphor film and prevent charging-up of electrons.

As an ultraviolet radiation phosphor was used a $ZnO \cdot Ga_2O_3$:Cd phosphor as in Example 5. As a sulfide system phosphor was used the same ZnS:Cu,Al as in Example 5, with which 2 wt % $In_2O_3$ was mixed as a conductive material.

A fluorescent composition A of the present invention was synthesized by mixing the $ZnO \cdot Ga_2O_3$:Cd phosphor of 25 wt % and the ZnS:Cu,Al+$In_2O_3$ phosphor of 75 wt %. For comparison, a fluorescent composition B of the prior art was synthesized by adding $In_2O_3$ in an amount as high as 20 wt % to a ZnS:Cu,al phosphor, which was free of any ultraviolet radiation phosphor.

Figure 13:
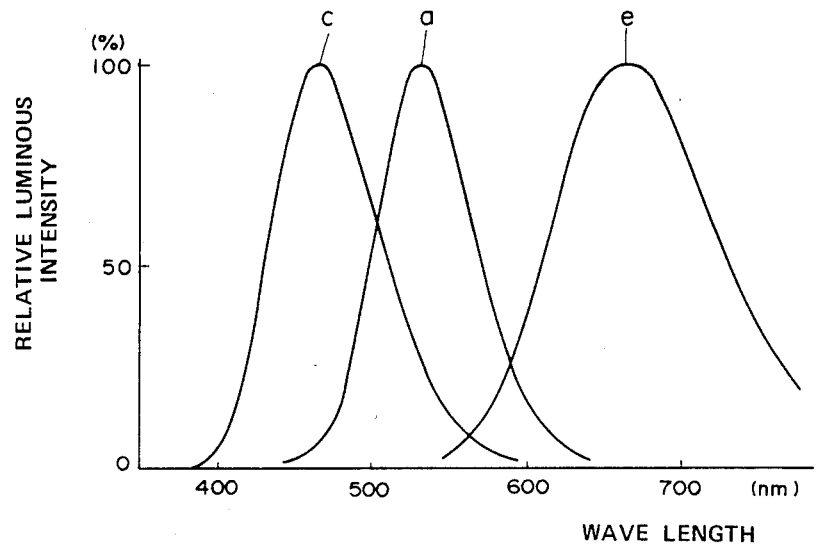
FIG. 13 is a graphical representation showing spectrum distribution of each of fluorescent compositions A, B and C of the present invention.

The phosphor composition A obtained was mounted in a fluorescent display device, which was then operated while applying voltage to an anode to measure a luminous color of the composition A. FIG. 13 shows a luminous spectrum of the phosphor composition synthesized in each of the examples, wherein a curve a is a spectrum of the composition A of this example, which indicates that it emitted light of a green luminous color having a peak near 540 nm.

Figure 14:
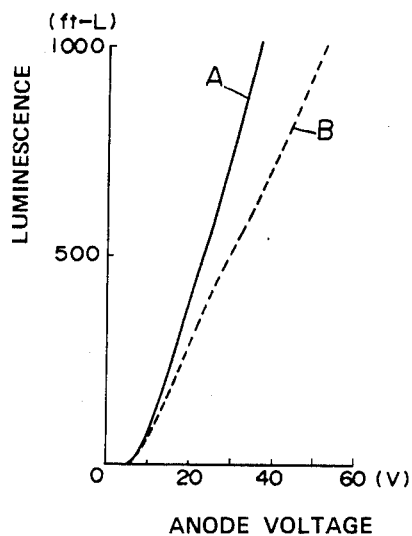
FIGS. 14 to 16 each are a graphical representation showing relationships between an anode voltage and luminescence in each of a fluorescent composition of the present invention and a conventional one.

Then, in order to measure relative luminescence of the composition A, the conventional ZnS:Cu,Al+$In_2O_3$ (20 wt %) phosphor composition B was mounted in a fluorescent display device, which was then operated while varying an anode voltage in a range of 0 to 50 V to measure luminescence. The results were as seen in FIG. 14 which shows relationships between the anode voltage and luminescence, wherein a solid line indicates the composition A of the present invention and dotted lines indicate the conventional composition B. Both compositions had a luminous threshold voltage of 5 to 6 V. However, an increase in an anode voltage to 30 V resulted in the conventional composition B exhibiting luminescence of 500ft-L, whereas the present composition A exhibiting luminescence as high as 750ft-L. Also, FIG. 14 indicates that the present invention was superior to the prior art at other anode voltages as well.

Figure 17:
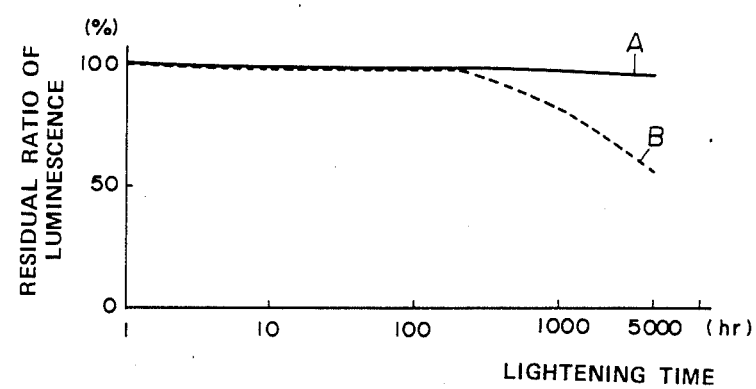
FIG. 17 to 19 each are a graphical representation showing relationships between a continuous lightening time and a residual ratio of luminescence in each of a fluorescent composition of the present invention and a conventional one.

Then, emission of the compositions A and B was carried out at the same initial luminescence, under which a life test by continuous lightening was carried out with respect to each composition. The results were as shown in FIG. 17, which indicates a residual ratio of luminescence of the present composition A after the lapse of 5000 hours was as high as 95%, whereas that of the conventional composition B was as low as 55%. Such a difference would be due to a difference in anode current caused by a difference in electron emitting capability of a filamentary cathode. More particularly, the conventional fluorescent composition exhibited luminescence of 750ft-L at an anode voltage of 42 V, whereas the present composition exhibited it at an anode voltage as low as 30 V. This indicates that the present composition was efficient because it exhibited desired luminescence at low energy. Thus, it will be noted that the present composition decreases a possibility of being decomposed by electron energy as compared with the conventional one, resulting in scattering of sulfide being reduced to a degree sufficient to substantially decrease poisoning of a filamentary cathode, so that electron emission capability of the filamentary cathode may be satisfactorily ensured as compared with in the conventional composition.

EXAMPLE 7

A $ZnO \cdot Ga_2O_3$:Cd phosphor was used in an amount of 30 wt % as the ultraviolet radiation phosphor as in Example 6 and a ZnS:(Zn) sulfide phosphor doped with $In_2O_3$ of 3 wt % was used in an amount of 70 wt % as the electron excitation visible light emitting phosphor. Both phosphors were mixed to synthesize a fluorescent composition C of the present invention.

The $ZnO \cdot Ga_2O_3$:Cd phosphor was prepared according to Example 5. As the ZnS:(Zn) sulfide phosphor was used a commercially available one, which was then mixed with $In_2O_3$ particles of 3 wt %.

The so-obtained phosphor composition C was mounted in a fluorescent display device, which was then operated to measure a luminous color of the composition. A spectrum of the composition was as indicated at a curve c in FIG. 13, which emitted light of a blue luminous color having a peak near 450 nm.

Figure 15:
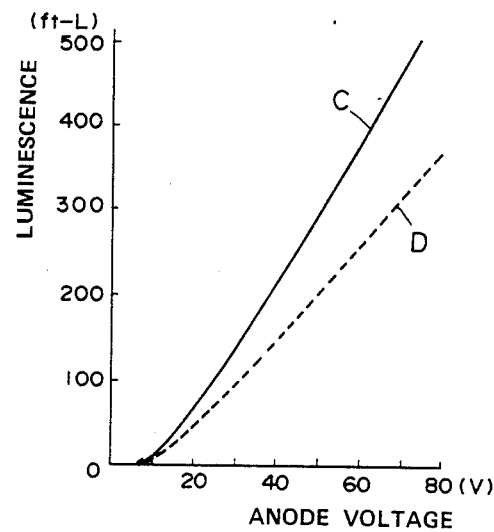

Subsequently, in order to determine relative luminescence of the present composition C, a conventional fluorescent composition D was formed of ZnS(Zn) mixed with $In_2O_3$ of 20 wt % for comparison. It was mounted in a fluorescent display device, which was then operated while varying an anode voltage between 0 V and 70 V to measure luminescence of the composition D. The results were as shown in FIG. 15, wherein a solid line indicates the present fluorescent composition C and dotted lines indicates the conventional ZnS:(Zn)+In$_2$O$_3$(20 wt %) phosphor D.

Both compositions had a threshold voltage below 10 V. However, the present composition C was increased in luminescence as an anode voltage was increased, so that it exhibited luminescence as high as 220ft-L at an anode voltage of 40 V; whereas the conventional composition D exhibited luminescence as low as 150ft-L at the same voltage.

Figure 18:
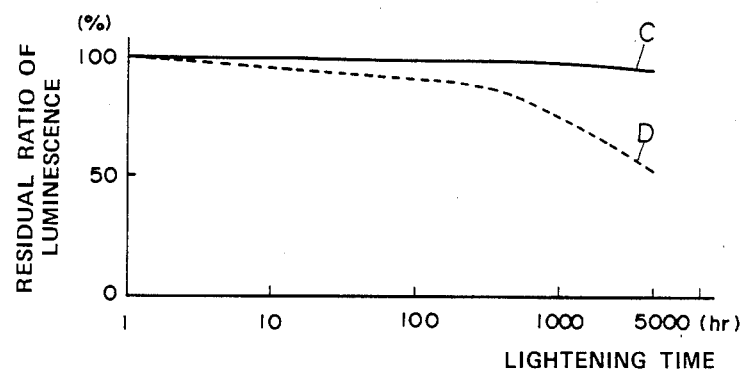

Then, emission of both compositions C and D was carried out at the same initial luminescence, under which a life test by continuous lightening was carried out with respect to each composition. The results were as shown in FIG. 18, which indicates that a residual ratio of luminescence of the present composition C after the lapse of 5000 hours was as high as 92%, whereas that of the conventional composition B was as low as 50%.

Thus, it will be noted that the present composition C exhibits high luminescence at a low anode voltage sufficient to substantially prevent its decomposition of decompose it, accordingly, scattering of the sulfide is substantially reduced, resulting in being substantially free of poisoning of a filamentary cathode of the device. This means that use of the present composition improves reliability of a fluorescent display device.

EXAMPLE 8

A fluorescent composition E of the present invention was synthesized by using a ZnO·Ga$_2$O$_3$:Cd phosphor in an amount of 10 wt % as the ultraviolet emission phosphor as in Example 7 and a (Zn$_{0.2}$Cd$_{0.8}$)S Ag,Cl sulfide phosphor in an amount of 90 wt % as the visible emission phosphor.

For comparison, a fluorescent composition F of the prior art was synthesized using (Zn$_{0.2}$Cd$_{0.8}$)S Ag,Cl mixed with In$_2$O$_3$ of 10 wt %.

It was determined that the present ZnO·Ga$_2$O$_3$:Cd+(Zn$_{0.2}$Cd$_{0.8}$)S:Ag,Cl composition E emits light of a red luminous color having a peak near 660 nm, as indicated at a curve e in FIG. 13 showing a luminous spectrum.

Figure 16:
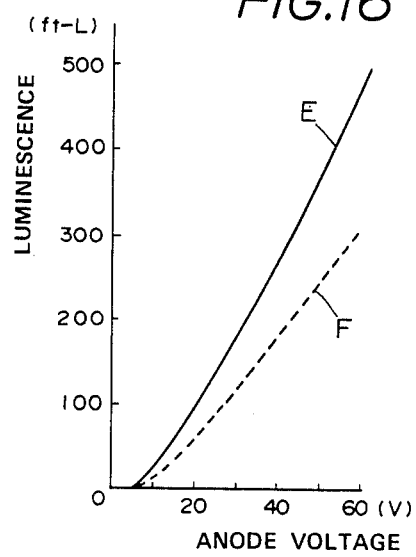

Then, the compositions E and F each were mounted in a fluorescent display device, which was operated while varying an anode voltage between 0 V and 60 V to measure luminescence of the composition. The results were as seen in FIG. 16 showing relationships between the anode voltage and the luminescence.

The present fluorescent composition E exhibited high luminescence as compared with the conventional composition F, as in Examples 6 and 7. More specifically, luminescence of the present composition E was as high as 275ft-L, whereas that of the conventional composition F was as low as 175ft-L.

Figure 19:
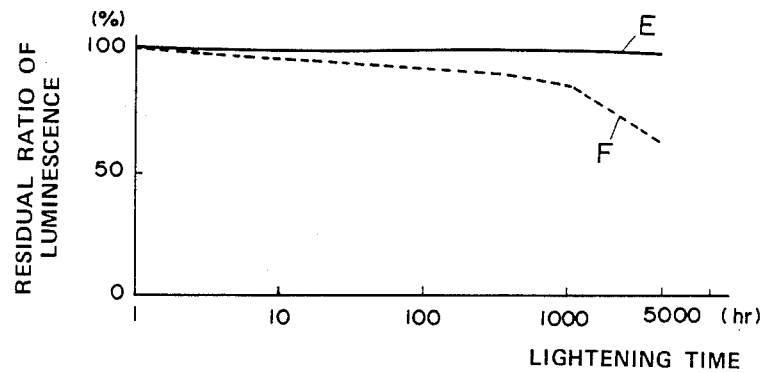

In addition, the compositions E and F were subjected to a life test by continuous lightening at the same initial luminescence. The results were as indicated in FIG. 19. A residual ratio of luminescence of the present composition E after the lapse of 5000 hours was as high as 98%, whereas that of the conventional composition F was as low as 60%.

Thus, it will be noted that the present composition E decreases scattering of sulfide gas during the emission to substantially reduce deterioration of a filamentary cathode.

EXAMPLE 9

A fluorescent composition of the present invention of which one of components is an ultraviolet radiation phosphor which efficiently emits ultraviolet rays of 365 nm under electron or ultraviolet excitation was prepared. In the example, as the ultraviolet radiation phosphor was selectively used a ZnO Ga$_2$O$_3$:Cd phosphor which emits ultraviolet rays of 365 nm under low velocity electron excitation.

Figure 20:
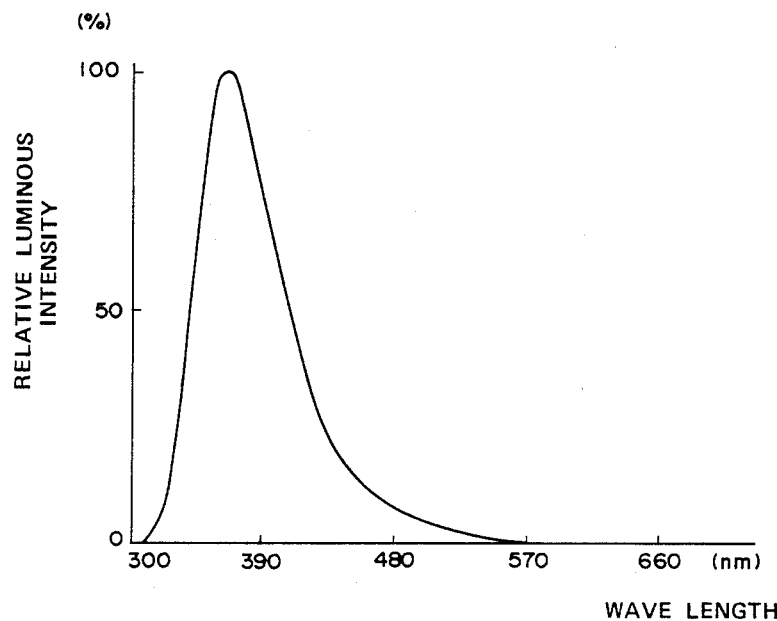
FIG. 20 is a graphical representation showing a luminous spectrum of an ultraviolet radiation phosphor which is one of components of a fluorescent composition according to the present invention.

The ZnO·Ga$_2$O$_3$:Cd phosphor was obtained by fully mixing predetermined amounts of ZnO and CdO or CdCO$_3$ and Ga$_2$O$_3$ together to prepare a mixture, charging it in an alumina crucible and firing it in an oxidizing, neutral or weak-reducing atmosphere at 900°–1500° C. for 1–10 hours. It was found that doping of Cd is effective in an amount of $5 \times 10^{-4}$ to $3 \times 10^{-1}$ mol per 1 mol of the ZnO·Ga$_2$O$_3$ matrix. As one example, the ZnO·Ga$_2$O$_3$:Cd phosphor doped with Cd of $1 \times 10^{-1}$ mol was deposited on an anode conductor of a fluorescent display device, which was then operated at an anode voltage of 30 V to measure a luminous spectrum of the phosphor. The results were as indicated in FIG. 20. As seen from FIG. 20, the ultraviolet radiation phosphor had a luminous peak at an ultraviolet region of 365 nm and was substantially free of a visible light emitting component. The phosphor had an optical band gap of about 4.4 eV and was free of a component emitting ultraviolet rays of a wavelength less than 280 nm such as ultraviolet rays of 254 nm emitted from mercury.

A phosphor emitting visible light under ultraviolet excitation or an ultraviolet excitation visible light emitting phosphor which is the other component of the fluorescent composition of the example includes, for example, a (BaCaMg)$_5$(PO$_4$)$_3$:Eu phosphor, a BaMg$_2$Al$_{16}$O$_{27}$ phosphor and a Ba$_3$(PO$_4$)$_2$:Eu phosphor each emitting light of a blue luminous color; a LaPO$_4$:Ce,Tb phosphor of a green luminous color; a 3Sr$_3$(PO$_4$)$_2$SrF$_2$:Sn,Mg phosphor of a yellow luminous color; and a Mg$_6$As$_2$O$_{11}$:Mn phosphor, a 3.5MgO0.5MgF$_2$GeO$_2$:Mn phosphor, a YVO$_4$:Eu phosphor and a Y$_2$O$_2$S:Eu phosphor each emitting light of a red luminous color.

Subsequently, an experiment was carried out to determine a mixing ratio between the ultraviolet radiation phosphor and the ultraviolet excitation visible light emitting phosphor.

In general, an excess of the ultraviolet radiation phosphor relatively decreases the ultraviolet excitation visible light emitting component of the fluorescent composition, so that luminescence may not be obtained which is sufficient to permit it to be put to practical use; whereas an excess of the ultraviolet excitation visible light emitting phosphor causes a decrease in the ultraviolet radiation phosphor serving as an excitation source to reduce radiation of ultraviolet rays, resulting in a failure in desired luminescence.

Figure 21:
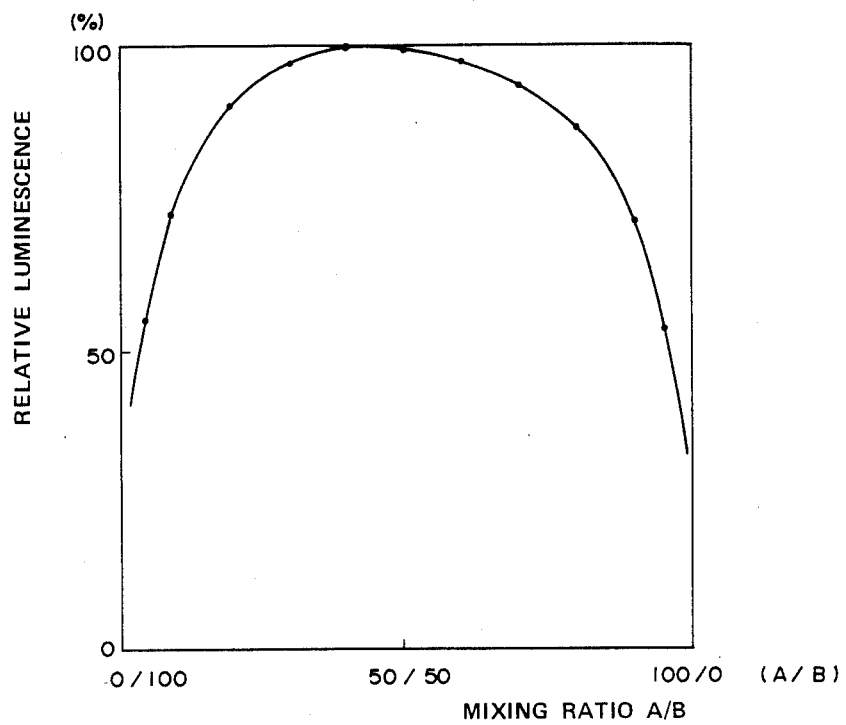
FIG. 21 is a graphical representation showing relationships between a mixing ratio between an ultraviolet radiation $ZnO \cdot Ga_2O_3$:Cd phosphor and an ultraviolet excitation visible light emitting $(BaCaMg)_5(PO_4)_3$:Eu phosphor and relative luminescence.

In view of this above, in the example, fluorescent compositions of the present invention were synthesized by using a ZnO·Ga$_2$O$_3$:Cd phosphor doped with Cd of 0.1 mol as the ultraviolet radiation phosphor and a commercially available (BaCaMg)$_5$(PO$_4$)$_3$:Eu phosphor as the ultraviolet excitation visible light emitting phosphor and varying a mixing ratio between both phosphors. The fluorescent compositions synthesized each were mounted in a fluorescent display device, which was then operated at an anode voltage of 50 V to measure relative luminescence of the composition. The results were as indicated in FIG. 21 showing relationships between the mixing ratio and the relative luminescence. As is apparent from FIG. 21, when a mixing ratio A/B by weight between the ultraviolet radiation phosphor A and the ultraviolet excitation visible light emitting phosphor B ranged from 5/95 to 95/5, the relative luminescence was as high as 50% sufficient to put the composition to practical use.

Similar results were obtained by substituting each of the above-noted ultraviolet excitation visible light emitting phosphors for the $(BaCaMg)_5(PO_4)_3$ as the phosphor B. The ultraviolet excitation visible light emitting phosphor generally has high resistance, accordingly, a conductive material such as $In_2O_3$ or the like may be incorporated therein to decrease resistance of a deposited film of the fluorescent composition and prevent charging-up of electrons, as required.

EXAMPLE 10

In the example, a fluorescent composition of the present invention was prepared by using a $ZnO \cdot Ga_2O_3:Cd$ phosphor as the ultraviolet radiation phosphor A as in Example 9 and a commercially available $(BaCaMg)_5(PO_4)_3:Eu$ phosphor as the ultraviolet excitation visible light emitting phosphor B and adding $In_2O_3$ in an amount of 10 wt % as a conductive material to the phosphors.

A mixing ratio A/B between both phosphors was set at 30/70 in view of the results obtained in Example 9. The so-prepared fluorescent composition was mounted in a fluorescent display device, which was then operated at an anode voltage ranging from 0 V to 60 V to measure luminescence of the composition.

Figure 23:
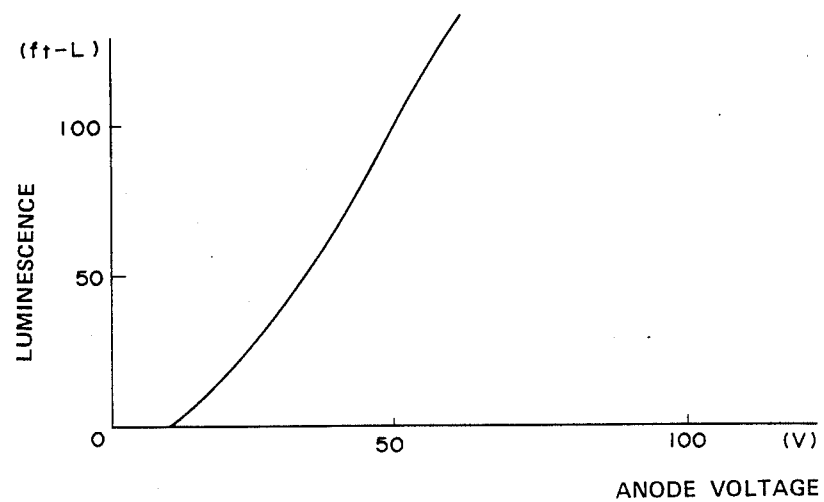
FIGS. 23 to 25 each are a graphical representation showing relationships between an anode voltage and luminescence in each of fluorescent compositions which was mounted in a fluorescent display device.

FIG. 23 shows relationships between the anode voltage and the luminescence. The fluorescent composition started to emit light at an anode voltage of 10 V and exhibited luminescence of 100ft-L at 50 V.

Figure 22:
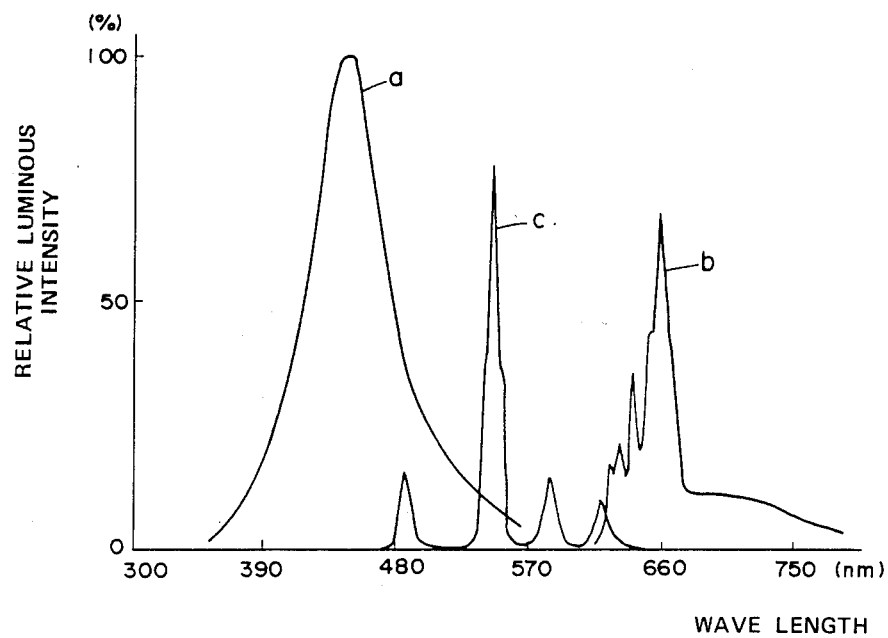
FIG. 22 is a graphical representation showing a luminous spectrum of each of fluorescent compositions of the present invention.

The fluorescent composition emitted light of a blue luminous color having a peak near 430 nm as indicated at a curve a of a luminous spectrum in FIG. 22.

EXAMPLE 11

A fluorescent composition of the present invention was prepared by using a $ZnO \cdot Ga_2O_3:Cd$ phosphor as the ultraviolet radiation phosphor A as in Example 9 and a commercially available $Mg_6As_2O_{11}:Mn$ as the ultraviolet excitation visible light emitting phosphor B to which a conductive material $In_2O_3$ was added in an amount of 15 wt % for the purpose of decreasing resistance of the phosphor B.

Both phosphors were mixed together at a mixing ratio A/B of 35/65 to synthesize the fluorescent composition, which was mounted in a fluorescent display device. The device was then operated at an anode voltage of 0–60 V to measure luminescence of the composition.

Figure 24:
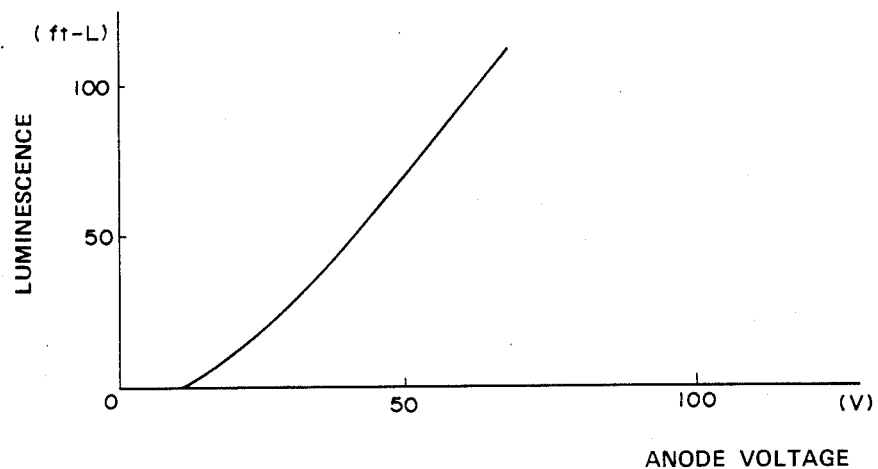

FIG. 24 shows relationships between the anode voltage and the luminescence and indicates that the composition had a luminous threshold voltage of 10 V and exhibited luminescence of 93ft-L at an anode voltage of 60 V.

Also, the composition emitted light of a red luminous color having a peak near 660 nm as indicated at a curve b of a luminous spectrum in FIG. 22.

EXAMPLE 12

A fluorescent composition of the present invention was prepared by using a $ZnO \cdot Ga_2O_3:Cd$ phosphor as the ultraviolet radiation phosphor A as in Example 9 and a commercially available $LaPO_4:Ce,Tb$ as the ultraviolet excitation visible light emitting phosphor B to which a conductive material $In_2O_3$ was added in an amount of 10 wt % for the purpose of decreasing resistance of the phosphor B.

Both phosphors were mixed together at a mixing ratio A/B of 40/60 to synthesize the fluorescent composition, which was mounted in a fluorescent display device. The device was then operated at an anode voltage of 0–60 V to measure luminescence of the composition.

Figure 25:
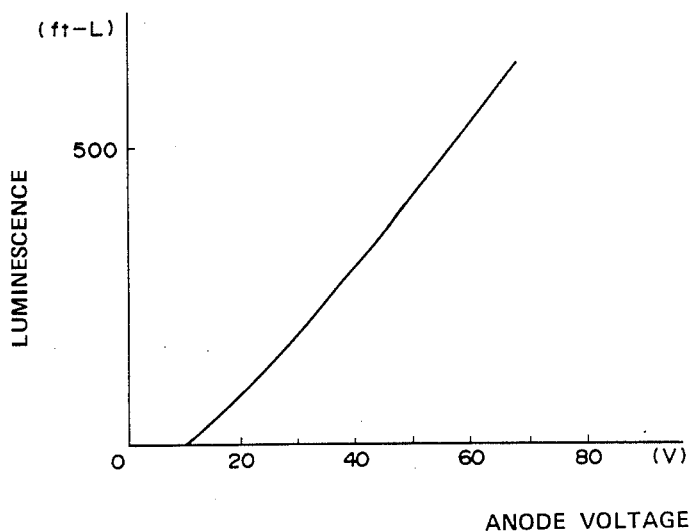

FIG. 25 shows relationships between the anode voltage and the luminescence and indicates that the present composition had a luminous threshold voltage of 10 V and exhibited luminescence of 410ft-L at an anode voltage of 50 V.

Also, the composition emitted light of a green luminous color having a peak near 550 nm as indicated at a curve c of a luminous spectrum in FIG. 22.

EXAMPLE 13

Figure 26:
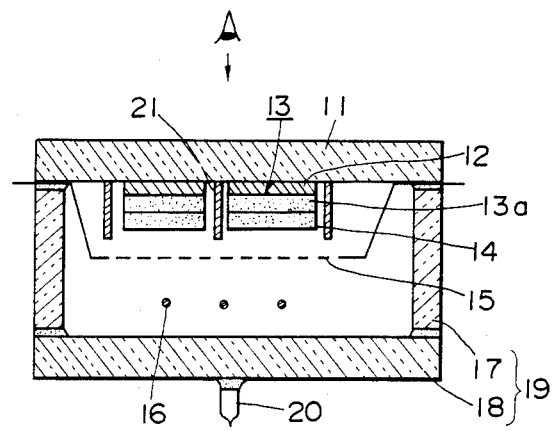
FIG. 26 is a schematic sectional view showing one example of a fluorescent display device of the present invention.

A fluorescent luminous device of the present invention was constructed in such a manner as shown in FIG. 26. More particularly, an insulating substrate 11 was formed of a transparent glass plate. On an inner surface of the substrate 11 was aranged anode conductors 12 formed of a transparent conductive film such as an ITO (indium tin oxide) film, a nesa film or the like. The anode conductors may comprise a light-permeable anode conductors formed of a stripe-like aluminum film to define a gap therebetween.

Then, an ultraviolet excitation visible light emitting phosphor 13a was deposited on each of the anode conductors 12 to form a luminous section 13. The visible light emitting phosphor 13a is required to efficiently emit visible light under ultraviolet radiation. For this purpose, a $(BaCaMg)_5(PO_4):Eu$ phosphor mixed with 20% $In_2O_3$ was used as the phosphor 13a.

Then, an ultraviolet radiation phosphor 14 was deposited on a surface of each of the ultraviolet excitation visible light emitting phosphors 13a.

The ultraviolet radiation phosphor 14 is adapted to emit ultraviolet rays under electron excitation. In the example, a $ZnO \cdot Ga_2O_3:Cd$ phosphor was used as the phosphor 14.

Subsequently, control electrodes 15 were arranged opposite to the ultraviolet radiation phosphors 14 and apart therefrom. The control electrode 15 was arranged with respect to every visible light emitting phosphor 13a and formed to carry out ON-OFF control of electrons emitted from cathodes. The control electrodes maybbe typically formed into a mesh-like shape. However, they may be formed into a wire- or frame-like shape.

Filamentary cathodes were stretchedly arranged opposite to the ultraviolet radiation phosphors 14 and apart from the control electrodes 15.

Thereafter, a casing 19 constituted by side plates 17 and a cover plate 18 was hermetically bonded on a periphery of the substrate 11 by means of a sealing material to form an envelope for receiving the anode conductor 12, luminous section 13, ultraviolet radiation phosphor 14, control electrodes 15 and filamentary cathodes 16 therein.

The envelope airtightly constituted by the substrate 11, side plates 17 and cover plate 18 was then evacuated to high vacuum through an evacuation tube 20.

The fluorescent display device constructed as described was operated in the following manner.

A cathode voltage was applied to the filamentary cathodes 16 to heat them, resulting in emission of electrons therefrom. Then, a positive control voltage was applied to the control electrodes 15 opposite to the luminous section 13 to attract and accelerate the electrons, to thereby impinge the electrons on the ultraviolet radiation phosphor 14 to which a positive anode voltage was applied. When the anode voltage was applied to the transparent anode conductor 12, it was applied to the ultraviolet radiation phosphor 14 through the ultraviolet excitation visible light emitting phosphor 13a of which resistance was decreased. Impingement of the electrons on the ultraviolet radiation phosphor 14 caused it to be excited to emit or radiate ultraviolet rays.

Figure 30:
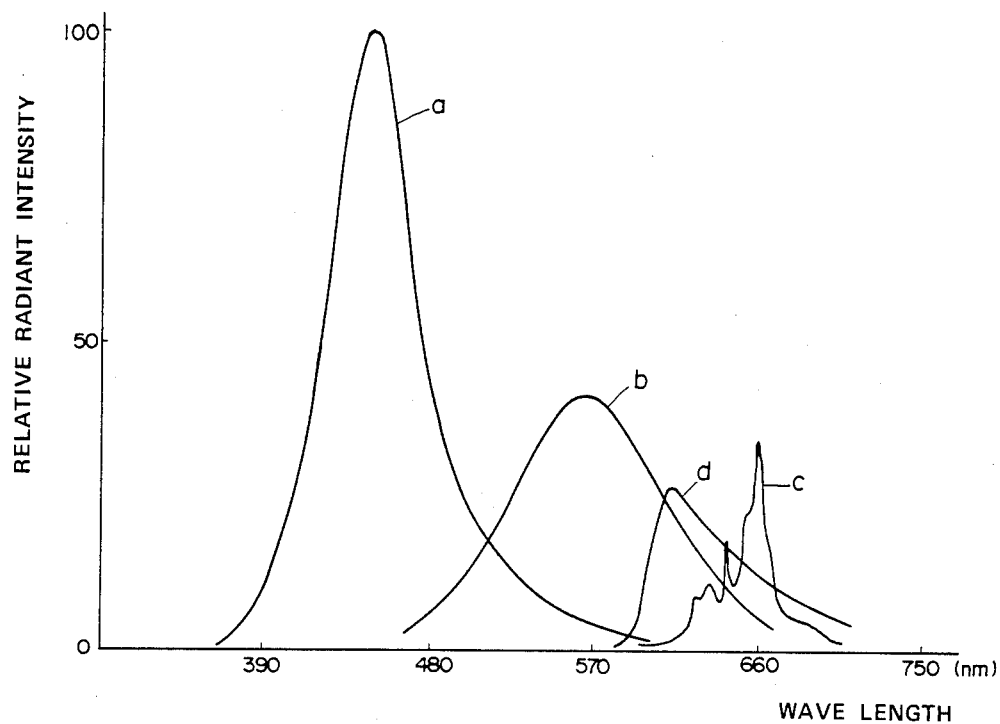
FIG. 30 is a graphical representation showing a luminous spectrum of each of visible light emitting phosphors of the present invention.
Figure 31:
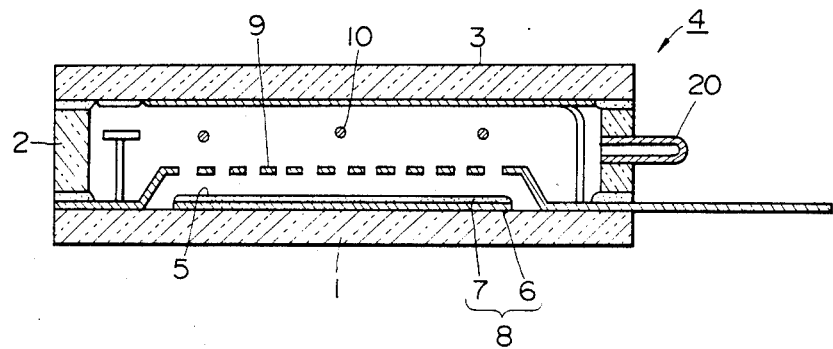
FIG. 31 is a schematic sectional view showing a conventional fluorescent display device of the present invention.

The so-radiated ultraviolet rays were impinged on the ultraviolet excitation visible light emitting phosphor 13a or $(BaCaMg)_5(PO_4)_3$ phosphor to excite it, resulting in it emitting visible light of a blue luminous color as indicated at a curve a in FIG. 30, which was observed through the transparent anode conductor 12 and substrate 11 from the substrate side.

Reference 21 designates a shield plate which was arranged to prevent ultraviolet rays emitted from the ultraviolet radiation phosphor 14 from being impinged on the ultraviolet excitation visible light emitting phosphor 13a of each adjacent luminous section 13. When the fluorescent display device is for digital display, the shield plate 21 is provided for every digit; whereas when it is for analog display, it is provided for every luminous display. Such construction effectively prevents leakage emission. In the example, the ultraviolet radiation phosphor 14 was superposed on the ultraviolet excitation visible light emitting phosphor 13a. However, both phosphors may be used in a manner mixed together.

The fluorescent display device of the example is suitable for digital or analog display of various data like a conventional front emission type fluorescent display device.

EXAMPLE 14

Figure 27:
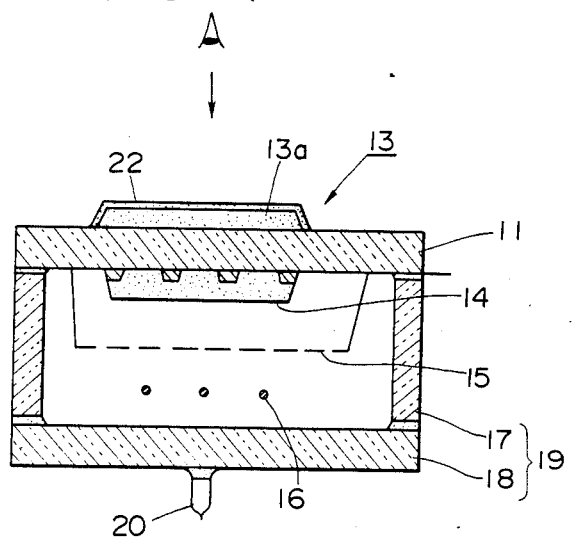
FIG. 27 is a schematic sectional view showing another example of a fluorescent display device of the present invention.

A fluorescent display device shown in FIG. 27 was fabricated. On an inner side of a substrate 11 were arranged stripe-like anode conductors 12 formed of an aluminum film by photolithography. The anode conductors 12 may be formed of a transparent conductive film as in Example 13.

Then, an ultraviolet radiation phosphor 14 was deposited on the anode conductors 12. A $ZnO \cdot Ga_2O_3:Cd$ phosphor was used as the ultraviolet radiation phosphor 14. The deposition may be carried out according to a suitable conventional method such as printing, electrodeposition or the like.

Control electrodes 15 and filamentary cathodes 16 were then arranged above the ultraviolet radiation phosphor 14 and opposite thereto in order as in Example 13.

Subsequently, an ultraviolet excitation visible light emitting phosphor 13a was deposited in the form of a display pattern on a portion of an outer surface of the substrate 11 opposite to the anode conductors 12 to form luminous sections 13. A $(Zn_{0.9}Cd_{0.1})S:Au,Al$ phosphor mixed with 5% $In_2O_3$ was used as the phosphor 13a. The phosphor 13a was covered with a protective film for protecting the phosphor 13a from moisture contained in air.

Thereafter, a casing 19 comprising side plates 17 and a cover plate 18 was hermetically bonded on a periphery of the substrate 11 by means of a sealing material to form an envelope, which was then evacuated through an evacuation tube 20 to form high vacuum therein.

The so-constructed fluorescent display device of the example was operated, as follows.

A cathode voltage was applied to the filamentary cathodes 16 to emit electrons therefrom, which were then accelerated by the control electrodes 15 to be impinged on the ultraviolet radiation phosphor 14, resulting in the ultraviolet radiation phosphor 14 being excited to radiate ultraviolet rays. The ultraviolet rays were then impinged through the substrate 11 on the visible light emitting phosphor 13a, so that it might be excited to emit visible light. The visible light emitted from the $(Zn_{0.9}Cd_{0.1})S:Au,Al$ phosphor exhibited a yellow luminous color having a peak near 570 nm and having a spectrum distributed at a wavelength range of 480–660 nm as indicated at a curve b in FIG. 30.

In the example, the sulfide system phosphor was used for the luminous display sections 13. Nevertheless, it did not adversely affect the filamentary cathodes 16 or deteriorate emission characteristics of the cathodes because was arranged on the outside of the envelope.

EXAMPLE 15

Figure 28:
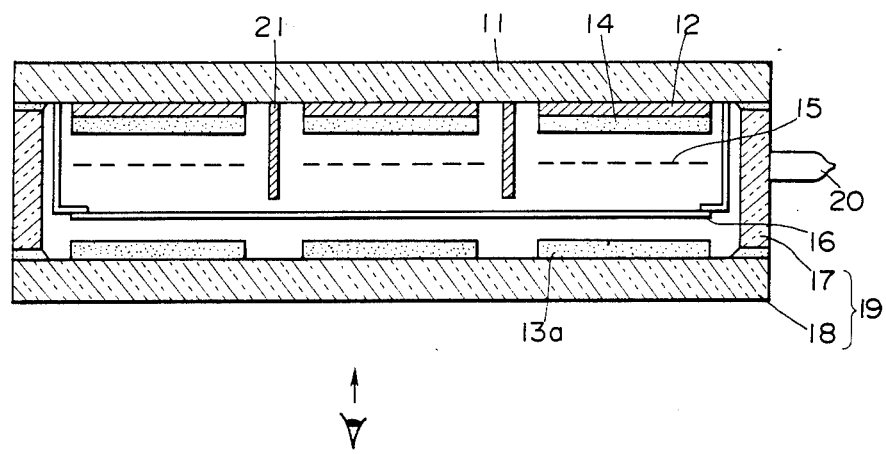
FIG. 28 is a schematic sectional view showing a further example of a fluorescent display device of the present invention.

A fluorescent display device shown in FIG. 28 was assembled. On an inner surface of a substrate 11 were arranged anode conductors 12 formed of a transparent conductive film in a manner to be opposite to luminous display sections 13. Then, an ultraviolet radiation or emission phosphor 14 was deposited on each of the anode conductors 12. Between each adjacent two ultraviolet emitting phosphors 14 was provided a shield plate 21 to prevent leakage emission. Also, a control electrode 15 and a filamentary cathode 16 were arranged in order above the ultraviolet emission phosphors 14 so as to opposite thereto.

Then, on an inner surface of a cover plate 18 opposite to the substrate 11 were deposited ultraviolet excitation visible light emitting phosphors 13a so as to be opposite to the ultraviolet emission phosphors 14, to thereby form luminous display sections 13. In the example, a $Mg_6As_2O_{11}:Mn$ phosphor was used as the phosphor 13a.

Further, a casing 19 constituted by side plates 17 and the cover plate 18 was hermetically bonded on a periphery of the substrate 11 by means of a sealing material to form an envelope, which was then evacuated through an evacuation tube 20 to form high vacuum therein.

The fluorescent display device of the example was operated in the following manner.

A cathode voltage was applied to the filamentary cathodes 16 to emit electrons therefrom, which were then accelerated by a positive control voltage applied to the control electrodes 15 to be impinged on the ultraviolet radiation phosphor 14 having a positive control voltage applied thereto, resulting in the ultraviolet radiation phosphor 14 being excited to radiate ultraviolet rays. The ultraviolet rays were then impinged through the control electrodes and filamentary cathodes on the ultraviolet excitation visible light emitting phosphors 13a deposited on the inside of the cover plate 18, so that they might be excited to emit visible light. The visible light exhibited a red luminous color having a spectrum distributed as indicated at a curve c in FIG. 30. The emission was observed through the cover plate 18. In the example, the shiled plate 21 were arranged between each adjacent ultraviolet emission phosphors 14, to thereby prevent leakage emission.

EXAMPLE 16

Figure 29:
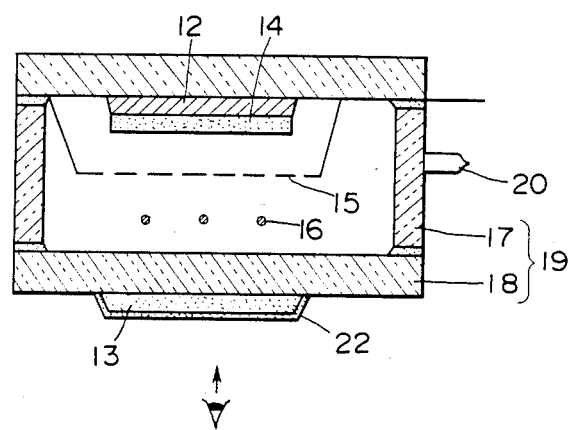
FIG. 29 is a schematic sectional view showing still another example of a fluorescent display device of the present invention.

Example 15 was substantially repeated to manufacture a fluorescent display device shown in FIG. 29 except that luminous display sections 13 were formed on an outside of a cover plate 18.

In the example, the luminous display sections are formed on the outside of the cover plate, so that a ultraviolet excitation visible light emitting phosphor may be deposited at a final step of manufacturing the fluorescent display device. Thus, it will be noted that in the example, an organic phosphor having a low degree of heat resistance may be used as the ultraviolet excitation visible light emitting phosphor.

Such an organic phosphor cannot be arranged in an envelope because it has poor heat-resistance and is deteriorated due to heating to 400°-500° C. However, the example permits use of the organic phosphor for a fluorescent display device.

Such an organic phosphor available includes FM-19 (blue luminous color), FM-12 (green), FM-13 (red) and FM-14 (orange-colored) which are manufactured by Shinroihi Kabushiki Kaisha, and the like.

In the example, FM-14 was mounted in the fluorescent display device, which was then operated at an anode voltage of 30 V, resulting in it exhibiting orange-colored luminance as indicated at a curve d in FIG. 30.

Obviously many modifications and variations of the present invention are possible in the light of the above teachings. It is therefore to be understood that within the scope of the appended claims the invention may be practiced otherwise than as specifically described.

What is claimed is:

1. A phosphor having a general formula $ZnO \cdot Ga_2O_3:Cd$ wherein the molar ratio of $Ga_2O_3$ to ZnO is 1:0.5-4.0 and Cd is present in an amount of $5 \times 10^{-4}$ to $3 \times 10^{-1}$ mol., the phosphor being excitable by electron or ultraviolet excitation and having a peak wavelength emission of about 365 nm and exhibiting, a higher luminance than said phosphor absent Cd.

2. A fluorescent composition comprising:
a mixture of the $ZnO \cdot Ga_2O_3:Cd$ phosphor of claim 1 and a ZnS, zinc cadmium sulfide of $Y_2O_2S$ electron excitable visible light emitting phosphor wherein said $ZnO \cdot Ga_2O_3:Cd$ phosphor is present in amount of 2 to 70% by weight.

3. A fluorescent composition comprising:
a mixture of the $ZnO \cdot Ga_2O_3:Cd$ phosphor of claim 1 and an ultraviolet excitable visible light emitting phosphor emitting visible light when excited by ultraviolet rays of 300 to 400 nm, wherein said $ZnO \cdot Ga_2O_3:Cd$ phosphor is present in an amount of 5 to 95% by weight.

4. A flourescent composition as defined in claim 3 wherein the ultraviolet excitable visible light emitting phosphor is at least one selected from the group consisting of $Ba_3(PO_4):Eu$, $(BaCaMg)_5(PO_4)_3:Eu$, $3Sr_3(PO_4)_2SrF_2:Sn,Mn$ $LaPO_4:Ce, Tb$ $Mg_6As_2O_{11}:Mn$, $3.5MgO \; 0.5MgF_2GeO_2:Mn$, $YVO_4:Eu$ and $BaMg_2Al_{16}O_{27}:Eu$.

5. A fluorescent luminous device comprising:
filamentary cathodes for emitting electrons;
anode conductors to which an anode voltage is applied;
at least one $ZnO \cdot Ga_2O_3:Cd$ phospor as defined in claim 1 arranged so as to be electrically connected to said anode condcutors;
an envelope for receiving said respective electrode elements therein;
at least a luminous display section having an ultraviolet excitable visible light emitting phosphor deposited thereon within a region of radiation of ultraviolet rays radiated from said $ZnO \cdot Ga_2O_3:Cd$ phosphor and excitable by said rays to emit visible light.

6. A fluorescent luminous device as defined in claim 5, wherein said anode conductors arranged in said envelope are light-permeable, said ultraviolet excitable visible light emitting phosphor and $ZnO \cdot Ga_2O_3:Cd$ phosphor being arranged on said anode condcutors.

7. A fluorescent luminous device as defined in claim 5, wherein said $ZnO \cdot Ga_2O_3:Cd$ phosphor is arranged on said anode conductors arranged in said envelope and said ultraviolet excitable visible light emitting phosphor is arranged on any one of an inside and an outside of said envelope opposite to said $ZnO \cdot Ga_2O_3:Cd$ phosphor.

8. A phosphor having the general formula $ZnO \cdot Ga_2O_3:Cd, Re$ wherein Re is at least one element selected from the group consisting of Ce, Pr, Nd, Sm, Eu, Tb, Dy, Ho, Er, and Tm, the molar ratio of $Ga_2O_3$ to ZnO is 1:1.4-4.0, Cd is present in an amount of $1 \times 10^{-3}$ to $2 \times 10^{-1}$ atm/mol.

* * * * *